US009904269B2

(12) United States Patent
Al-Mohssen et al.

(10) Patent No.: US 9,904,269 B2
(45) Date of Patent: *Feb. 27, 2018

(54) APPARATUS AND METHOD FOR DEMAND COORDINATION NETWORK CONTROL

(71) Applicant: ENERNOC, INC., Boston, MA (US)

(72) Inventors: Husain Al-Mohssen, Dedham, MA (US); Angela S. Bassa, Stoneham, MA (US); Richard R. Paradis, Franklin, MA (US); Randy C. Willig, Fort Collins, CO (US)

(73) Assignee: ENERNOC, INC., Boston, MA (US)

( * ) Notice: Subject to any disclaimer, the term of this patent is extended or adjusted under 35 U.S.C. 154(b) by 295 days.

This patent is subject to a terminal disclaimer.

(21) Appl. No.: 14/674,057

(22) Filed: Mar. 31, 2015

(65) Prior Publication Data

US 2016/0291562 A1    Oct. 6, 2016

(51) Int. Cl.
G05D 3/12     (2006.01)
G05B 19/048   (2006.01)
G06Q 50/00    (2012.01)
G05B 19/10    (2006.01)

(52) U.S. Cl.
CPC ......... *G05B 19/048* (2013.01); *G05B 19/106* (2013.01); *G06Q 50/00* (2013.01); *G05B 2219/2639* (2013.01)

(58) Field of Classification Search
CPC ...................................... H02J 3/382
USPC ........................................ 700/297
See application file for complete search history.

(56) References Cited

U.S. PATENT DOCUMENTS

| 4,023,043 A | 5/1977 | Stevenson |
| 4,090,088 A | 5/1978 | McMahon et al. |
| 4,168,491 A | 9/1979 | Phillips et al. |
| 4,228,364 A * | 10/1980 | Walden .................... H02J 3/14 307/115 |
| 4,804,957 A | 2/1989 | Selph et al. |

(Continued)

OTHER PUBLICATIONS

Barker, Sean et al. "SmartCap: Flattening Peak Electricity Demand in Smart Homes." 2012 IEEE International Conference on Pervasive Computing and Communications, Lugano (Mar. 19-23, 2012) pp. 67-75.

(Continued)

*Primary Examiner* — Suresh Suryawanshi
(74) *Attorney, Agent, or Firm* — Richard K. Huffman

(57) ABSTRACT

An apparatus including devices, a network operations center (NOC), and control nodes. Each of the devices consumes a portion of a resource when turned on, and performs a corresponding function within an acceptable operational margin by cycling on and off. The NOC is disposed external to a facility, and determines an energy lag for the facility based upon fine-grained energy consumption baseline data. The NOC employs the energy lag to generate a plurality of run time schedules that coordinates run times for the each of the devices to control the peak demand of the resource. Each of the plurality of control nodes is coupled to a corresponding one of the plurality of devices. The plurality of control nodes transmits sensor data and device status to the NOC via the demand coordination network for generation of the plurality of run time schedules, and executes selected ones of the run time schedules to cycle the plurality of devices on and off.

22 Claims, 11 Drawing Sheets

(56) References Cited

U.S. PATENT DOCUMENTS

| | | | |
|---|---|---|---|
| 5,274,571 A | 12/1993 | Hesse et al. | |
| 5,815,811 A | 9/1998 | Pinard et al. | |
| 5,897,607 A | 4/1999 | Jenney et al. | |
| 6,437,743 B1 | 8/2002 | Mintz et al. | |
| 6,512,737 B1 | 1/2003 | Agee | |
| 7,102,533 B2 | 9/2006 | Kim | |
| 7,177,728 B2 | 2/2007 | Gardner | |
| 7,324,876 B2 * | 1/2008 | Ying | H01H 9/32 337/16 |
| 7,376,122 B2 | 5/2008 | Draves, Jr. et al. | |
| 7,379,997 B2 | 5/2008 | Ehlers et al. | |
| 7,495,578 B2 | 2/2009 | Borleske | |
| 7,552,100 B2 | 6/2009 | Chen | |
| 7,580,775 B2 | 8/2009 | Kuylyk et al. | |
| 7,715,951 B2 | 5/2010 | Forbes, Jr. et al. | |
| 7,769,149 B2 | 8/2010 | Berkman | |
| 7,783,390 B2 | 8/2010 | Miller | |
| 7,881,889 B2 | 2/2011 | Barclay et al. | |
| 7,894,946 B2 | 2/2011 | Kuylyk et al. | |
| 7,949,615 B2 | 5/2011 | Ehlers et al. | |
| 7,992,630 B2 | 8/2011 | Springer et al. | |
| 8,019,567 B2 | 9/2011 | Steinberg et al. | |
| 8,041,467 B2 | 10/2011 | Black et al. | |
| 8,078,330 B2 | 12/2011 | Brickfield et al. | |
| 8,180,328 B2 | 5/2012 | Van De Groenendaal | |
| 8,185,245 B2 | 5/2012 | Amundson et al. | |
| 8,355,827 B2 | 1/2013 | Egnor et al. | |
| 8,367,984 B2 | 2/2013 | Besore et al. | |
| 8,370,283 B2 | 2/2013 | Pitcher et al. | |
| 8,401,709 B2 | 3/2013 | Cherian et al. | |
| 8,417,391 B1 | 4/2013 | Rombouts et al. | |
| 8,457,803 B2 | 6/2013 | Willig et al. | |
| 8,706,650 B2 | 4/2014 | Ozog | |
| 8,751,054 B2 | 6/2014 | Wang et al. | |
| 9,153,965 B2 | 10/2015 | Deshpande et al. | |
| 9,158,322 B2 * | 10/2015 | Willig | H04L 67/125 |
| 9,196,009 B2 | 11/2015 | Drees et al. | |
| 9,244,444 B2 | 1/2016 | Carty et al. | |
| 9,292,888 B2 | 3/2016 | An et al. | |
| 9,355,069 B2 | 5/2016 | ELBsat et al. | |
| 9,569,804 B2 | 2/2017 | Stein et al. | |
| 2002/0186167 A1 | 12/2002 | Anderson | |
| 2003/0112753 A1 | 6/2003 | Jo et al. | |
| 2004/0139038 A1 | 7/2004 | Ehlers et al. | |
| 2004/0150510 A1 | 8/2004 | Taka et al. | |
| 2004/0254686 A1 | 12/2004 | Matsui et al. | |
| 2005/0043862 A1 | 2/2005 | Brickfield et al. | |
| 2005/0055432 A1 | 3/2005 | Rodgers | |
| 2005/0073992 A1 | 4/2005 | Lee et al. | |
| 2005/0078631 A1 | 4/2005 | Cornwall | |
| 2005/0192713 A1 | 9/2005 | Weik et al. | |
| 2005/0282570 A1 | 12/2005 | Pulkkinen et al. | |
| 2006/0072694 A1 | 4/2006 | Dai et al. | |
| 2006/0104205 A1 | 5/2006 | Strutt et al. | |
| 2006/0135121 A1 | 6/2006 | Abedi et al. | |
| 2007/0005193 A1 | 1/2007 | Nelson et al. | |
| 2007/0013547 A1 | 1/2007 | Boaz | |
| 2007/0019552 A1 | 1/2007 | Senarath et al. | |
| 2007/0060132 A1 | 3/2007 | Wilhelmsson et al. | |
| 2007/0099624 A1 | 5/2007 | Guo | |
| 2007/0211687 A1 | 9/2007 | Benjebbour et al. | |
| 2007/0255461 A1 | 11/2007 | Brickfield et al. | |
| 2008/0012724 A1 | 1/2008 | Corcoran et al. | |
| 2008/0013502 A1 | 1/2008 | Clark | |
| 2008/0125069 A1 | 5/2008 | Davis et al. | |
| 2008/0192724 A1 | 8/2008 | Kondo et al. | |
| 2008/0205292 A1 | 8/2008 | Denby et al. | |
| 2008/0225737 A1 | 9/2008 | Gong et al. | |
| 2008/0267259 A1 | 10/2008 | Budampati et al. | |
| 2009/0005029 A1 | 1/2009 | Wang et al. | |
| 2009/0102680 A1 | 4/2009 | Roos | |
| 2009/0167558 A1 | 7/2009 | Borleske et al. | |
| 2009/0177520 A1 | 7/2009 | Bateni et al. | |
| 2009/0185542 A1 | 7/2009 | Zhang et al. | |
| 2009/0325566 A1 | 12/2009 | Bell et al. | |
| 2010/0039263 A1 | 2/2010 | Chen et al. | |
| 2010/0088261 A1 | 4/2010 | Montalvo | |
| 2010/0156632 A1 | 6/2010 | Hyland et al. | |
| 2010/0217450 A1 | 8/2010 | Beal et al. | |
| 2010/0217550 A1 | 8/2010 | Crabtree et al. | |
| 2010/0217651 A1 | 8/2010 | Crabtree et al. | |
| 2010/0222935 A1 | 9/2010 | Forbes, Jr. et al. | |
| 2010/0278187 A1 | 11/2010 | Hart et al. | |
| 2010/0286937 A1 | 11/2010 | Hedley et al. | |
| 2010/0328097 A1 | 12/2010 | Leo et al. | |
| 2011/0013586 A1 | 1/2011 | Oh et al. | |
| 2011/0035073 A1 | 2/2011 | Ozog | |
| 2011/0037612 A1 | 2/2011 | Cornwall | |
| 2011/0063126 A1 | 3/2011 | Kennedy et al. | |
| 2011/0119042 A1 | 5/2011 | Johnson et al. | |
| 2011/0130886 A1 | 6/2011 | Drees et al. | |
| 2011/0190951 A1 | 8/2011 | Lee | |
| 2011/0196513 A1 | 8/2011 | Willig et al. | |
| 2011/0231320 A1 | 9/2011 | Irving | |
| 2011/0280178 A1 | 11/2011 | Heifner | |
| 2011/0282504 A1 | 11/2011 | Besore et al. | |
| 2011/0286505 A1 | 11/2011 | Hedley et al. | |
| 2012/0019395 A1 | 1/2012 | Willig et al. | |
| 2012/0046796 A1 | 2/2012 | Zhang | |
| 2012/0113868 A1 | 5/2012 | Cummings | |
| 2012/0185106 A1 | 7/2012 | Ghosh et al. | |
| 2012/0232701 A1 | 9/2012 | Carty et al. | |
| 2012/0253527 A1 | 10/2012 | Hietala et al. | |
| 2012/0278051 A1 | 11/2012 | Jiang et al. | |
| 2012/0320768 A1 | 12/2012 | Shaffer et al. | |
| 2012/0330626 A1 | 12/2012 | An et al. | |
| 2013/0024141 A1 | 1/2013 | Marwah et al. | |
| 2013/0024710 A1 | 1/2013 | Jackson | |
| 2013/0041853 A1 | 2/2013 | Shnekendorf et al. | |
| 2013/0073273 A1 | 3/2013 | Madrazo et al. | |
| 2013/0181847 A1 | 7/2013 | Willig et al. | |
| 2013/0185437 A1 | 7/2013 | Willig et al. | |
| 2013/0195034 A1 | 8/2013 | Quan et al. | |
| 2013/0297091 A1 | 11/2013 | Willig et al. | |
| 2013/0297092 A1 | 11/2013 | Willig et al. | |
| 2013/0304269 A1 | 11/2013 | Shiel | |
| 2013/0304273 A1 | 11/2013 | Willig et al. | |
| 2013/0346768 A1 | 11/2013 | Forbes, Jr. et al. | |
| 2014/0148953 A1 | 5/2014 | Nwankpa et al. | |
| 2014/0297238 A1 | 10/2014 | Parthasarathy et al. | |
| 2015/0057820 A1 | 2/2015 | Kefayati et al. | |
| 2015/0074282 A1 | 3/2015 | Willig | |
| 2015/0076926 A1 | 3/2015 | Kosaka et al. | |
| 2015/0081052 A1 | 3/2015 | Willig | |
| 2015/0081053 A1 | 3/2015 | Willig | |
| 2015/0081105 A1 | 3/2015 | Willig et al. | |
| 2015/0081128 A1 | 3/2015 | Willig | |
| 2015/0081915 A1 | 3/2015 | Willig | |
| 2015/0088328 A1 | 3/2015 | Willig | |
| 2015/0088442 A1 * | 3/2015 | Farrar | G01R 21/1333 702/62 |
| 2015/0169795 A1 | 6/2015 | ELBsat et al. | |
| 2015/0198961 A1 | 7/2015 | Shiel | |
| 2015/0207752 A1 * | 7/2015 | Birkestrand | H04L 67/1008 709/226 |
| 2015/0227151 A1 | 8/2015 | Willig et al. | |
| 2015/0227152 A1 | 8/2015 | Willig et al. | |
| 2015/0227153 A1 | 8/2015 | Willig et al. | |
| 2015/0292902 A1 | 10/2015 | Willig et al. | |
| 2015/0292903 A1 | 10/2015 | Willig et al. | |
| 2015/0294557 A1 | 10/2015 | Willig et al. | |
| 2015/0304871 A1 | 10/2015 | Willig et al. | |
| 2015/0326276 A1 | 11/2015 | Willig | |
| 2015/0327089 A1 | 11/2015 | Willig et al. | |
| 2015/0341793 A1 | 11/2015 | Willig | |
| 2016/0119353 A1 | 4/2016 | Willig | |
| 2016/0119802 A1 | 4/2016 | Willig | |

(56) References Cited

U.S. PATENT DOCUMENTS

2016/0195887 A1 7/2016 Shiel
2016/0266181 A1 9/2016 Kawaguchi et al.

OTHER PUBLICATIONS

Irwin, David et al. "Exploiting Home Automation Protocols for Load Monitoring in Smart Buildings." Proceedings of the Third ACM Workshop on Embedded Sensing Systems for Energy-Efficiency in Buildings, Buildsys '11. Jan. 11, 2011. pp. 7-12.
Conca, James. "Demand Response Is How the Smart Grid Will Save Us Billions." Feb. 24, 2015 Forbes. pp. 1-5.
Lamonica, Martin. "Green Biz 101: What do you Need to Know About Demand Response?" Apr. 29, 2014 GreenBiz 101. pp. 1-9.

\* cited by examiner

NOC PROCESSOR FOR OFF-SITE DEMAND MANAGEMENT

MODEL PROCESSOR

5-PARAMETER REGRESSION MODEL DERIVED FROM FINE-GRAINED USAGE DATA

FINE-GRAINED BASELINE ENERGY DATA WEATHER NORMALIZATION APPARATUS

FINE-GRAINED BASELINE ENERGY DATA WEATHER NORMALIZATION METHOD

APPARATUS AND METHOD FOR DEMAND COORDINATION NETWORK CONTROL

CROSS-REFERENCE TO RELATED APPLICATIONS

This application is related to the following co-pending U.S. patent applications, each of which has a common assignee and common inventors.

| SER. NO. | FILING DATE | TITLE |
| --- | --- | --- |
| 14/673,995 | Mar. 31, 2015 | APPARATUS AND METHOD FOR FINE-GRAINED WEATHER NORMALIZATION OF ENERGY CONSUMPTION BASELINE DATA |
| 14/674,004 | Mar. 31, 2015 | SYSTEM FOR WEATHER INDUCED FACILITY ENERGY CONSUMPTION CHARACTERIZATION |
| 14/674,021 | Mar. 31, 2015 | DEMAND RESPONSE DISPATCH SYSTEM EMPLOYING WEATHER INDUCED FACILITY ENERGY CONSUMPTION CHARACTERIZATIONS |
| 14/674,033 | Mar. 31, 2015 | DEMAND RESPONSE DISPATCH PREDICTION SYSTEM |
| 14/674,041 | Mar. 31, 2015 | ENERGY BROWN OUT PREDICTION SYSTEM |

BACKGROUND OF THE INVENTION

1. Field of the Invention

This invention relates in general to the field of resource management, and more particularly to an off-site apparatus and method employing fine-grained weather normalization of energy consumption baseline data for coordinating the use of certain resources in a demand coordination network such that a peak demand of those resources is optimized.

2. Description of the Related Art

The problem with resources such as electrical power, water, fossil fuels, and their derivatives (e.g., natural gas) is that the generation and consumption of a resource both vary with respect to time. Furthermore, the delivery and transport infrastructure is limited in that it cannot instantaneously match generation levels to provide for consumption levels. The delivery and transport infrastructure is limited in supply and the demand for this limited supply is constantly fluctuating. As anyone who has participated in a rolling blackout will concur, the times are more and more frequent when resource consumers are forced to face the realities of limited resource supply.

Most notably, the electrical power generation and distribution community has begun to take proactive measures to protect limited instantaneous supplies of electrical power by imposing a demand charge on consumers in addition to their monthly usage charge. In prior years, consumers merely paid for the total amount of power that they consumed over a billing period. Today, most energy suppliers are not only charging customers for the total amount of electricity they have consumed over the billing period, but they are additionally charging for peak demand. Peak demand is the greatest amount of energy that a customer uses use during a measured period of time, typically on the order of minutes.

For example, consider a factory owner whose building includes 20 air conditioners, each consuming 10 kW when turned on. If they are all on at the same time, then the peak demand for that period is 200 kW. Not only does the energy supplier have to provide for instantaneous generation of this power in conjunction with loads exhibited by its other consumers, but the distribution network that supplies this peak power must be sized such that it delivers 200 kW.

Consequently, high peak demand consumers are required to pay a surcharge to offset the costs of peak energy generation and distribution. And the concept of peak demand charges, while presently being levied only to commercial electricity consumers and to selected residential consumers, is applicable to all residential consumers and consumers of other limited generation and distribution resources as well. Water and natural gas are prime examples of resources that will someday exhibit demand charges.

Yet, consider that in the facility example above it is not time critical or comfort critical to run every air conditioning unit in the building at once. Run times can be staggered, for example, to mitigate peak demand. And this technique is what is presently employed in the industry to lower peak demand. There are very simple ways to stagger run times, and there are very complicated mechanisms that are employed to lower peak demand, but they all utilize variations of what is known in the art as deferral.

Stated simply, deferral means that some devices have to wait to run while other, perhaps higher priority, devices are allowed to run. Another form of deferral is to reduce the duty cycle (i.e., the percentage of the a device cycle that a device is on) of one or more devices in order to share the reduction in peak demand desired. What this means in the air conditioning example above is that some occupants are going to experience discomfort while waiting for their turn to run. When duty cycles are reduced to defer demand, everyone in the facility is going to experience mild discomfort. And as one skilled in the art will appreciate, there is a zone of comfort beyond which productivity falls.

Virtually every system of resource consuming devices exhibits a margin of acceptable operation ("comfort zone" in the air conditioning example above) around which operation of the device in terms of start time, duration, and duty cycle can be deferred. But the present inventors have observed that conventional techniques for controlling peak demand all involve delaying ("deferring") the start times and durations of devices and/or decreasing the duty cycles, thus in many instances causing local environments to operate outside of their acceptable operational margins. It is either too hot, too cold, not enough water, the motors are not running long enough to get the job done, and etc. Furthermore, these conventional techniques do not take into account the energy lag of a building, that is, the transient response of the building's energy consumption in response to changes in outside temperature.

Accordingly, what is needed is an apparatus and method for managing peak demand of a resource that considers acceptable operational margins in determining when and how long individual devices in a system will run.

What is also needed is a technique for scheduling run times for devices in a controlled system that is capable of advancing the start times and durations of those devices, and that is capable of increasing the duty cycles associated therewith in order to reduce demand while concurrently maintaining operation within acceptable operational margins.

What is additionally needed is a mechanism for modeling and coordinating the operation of a plurality of devices in order to reduce peak demand of a resource, where both advancement and deferral are employed effectively to reduce demand and retain acceptable operational performance.

What is moreover needed is an demand coordination apparatus and method that employs adaptive modeling of local environments and anticipatory scheduling of run times in order to reduce peak demand while maintaining acceptable operation.

Furthermore, what is needed is a demand coordination mechanism perform adaptive modeling of local environments while taking into account the transient energy consumption of a building in response to changes in outside temperature.

SUMMARY OF THE INVENTION

The present invention, among other applications, is directed to solving the above-noted problems and addresses other problems, disadvantages, and limitations of the prior art. The present invention provides a superior technique for managing and controlling the demand level of a given resource as that resource is consumed by a plurality of consuming devices. In one embodiment, an apparatus for controlling peak demand of a resource within a facility. The apparatus includes a plurality of devices, a network operations center (NOC), and a plurality of control nodes. The plurality of devices is disposed within the facility, and each consumes a portion of the resource when turned on, and each is capable of performing a corresponding function within an acceptable operational margin by cycling on and off. The NOC is disposed external to the facility, and is configured to determine an energy lag for the facility based upon fine-grained energy consumption baseline data, and is configured to employ said energy lag to generate a plurality of run time schedules. The plurality of run time schedules coordinates run times for the each of the plurality of devices to control the peak demand of the resource. One or more of the run times start prior to when otherwise required to maintain corresponding local environments while operating within corresponding acceptable operating margins. The plurality of control nodes is disposed within the facility, and each is coupled to a corresponding one of the plurality of devices. The plurality of control nodes is coupled together via a demand coordination network that is operatively coupled to the NOC. The plurality of control nodes transmits sensor data and device status to the NOC via the demand coordination network for generation of the plurality of run time schedules, and the plurality of control nodes executes selected ones of the run time schedules to cycle the plurality of devices on and off.

One aspect of the present invention contemplates a peak demand control system, for managing peak energy demand within a facility. The peak demand control system has a network operations center (NOC), a plurality of control nodes, and one or more sensor nodes. The NOC is disposed external to the facility, and is configured to determine an energy lag for the facility based upon fine-grained energy consumption baseline data, and configured to employ said energy lag to generate a plurality of run time schedules, where the plurality of run time schedules coordinates run times for each of a plurality of devices to manage the peak energy demand, and where one or more of the run times start prior to when otherwise required to maintain corresponding local environments while operating within corresponding acceptable operating margins. The plurality of control nodes is disposed within the facility. Each is coupled to a corresponding one of the plurality of devices, where the plurality of control nodes are coupled together via a demand coordination network and operatively coupled to the NOC, and where the plurality of control nodes transmits sensor data and device status to the NOC via the demand coordination network for generation of the plurality of run time schedules, and where the plurality of control nodes executes selected ones of the run time schedules to cycle the plurality of devices on and off. The one or more sensor nodes are coupled to the demand coordination network, and are configured to provide one or more global sensor data sets to the NOC, where the NOC employs the one or more global sensor data sets in determining the run times.

Another aspect of the present invention comprehends a method for controlling peak demand of a resource within a facility. The method includes: via a network operations center (NOC) external to the facility, determining an energy lag for the facility based upon fine-grained energy consumption baseline data, and employing the energy lag to generate a plurality of run time schedules, where the plurality of run time schedules coordinates run times for each of a plurality of devices to control the peak demand of the resource, and where one or more of the run times start prior to when otherwise required to maintain corresponding local environments while operating within corresponding acceptable operating margins; controlling each of the plurality of devices via corresponding control nodes, where the each of the plurality of devices consumes a portion of the resource when turned on, and where the each of the plurality of devices is capable of performing a corresponding function within an acceptable operational margin by cycling on and off, and where the corresponding control nodes execute selected ones of the plurality of run time schedules to cycle the plurality of devices on and off; and first coupling the corresponding control nodes together via a demand coordination network that is operatively coupled to the NOC, and employing the demand coordination network to transmit sensor data and device status to the NOC for generation of the plurality of run time schedules.

BRIEF DESCRIPTION OF THE DRAWINGS

These and other objects, features, and advantages of the present invention will become better understood with regard to the following description, and accompanying drawings where.

DETAILED DESCRIPTION

Figure 1:
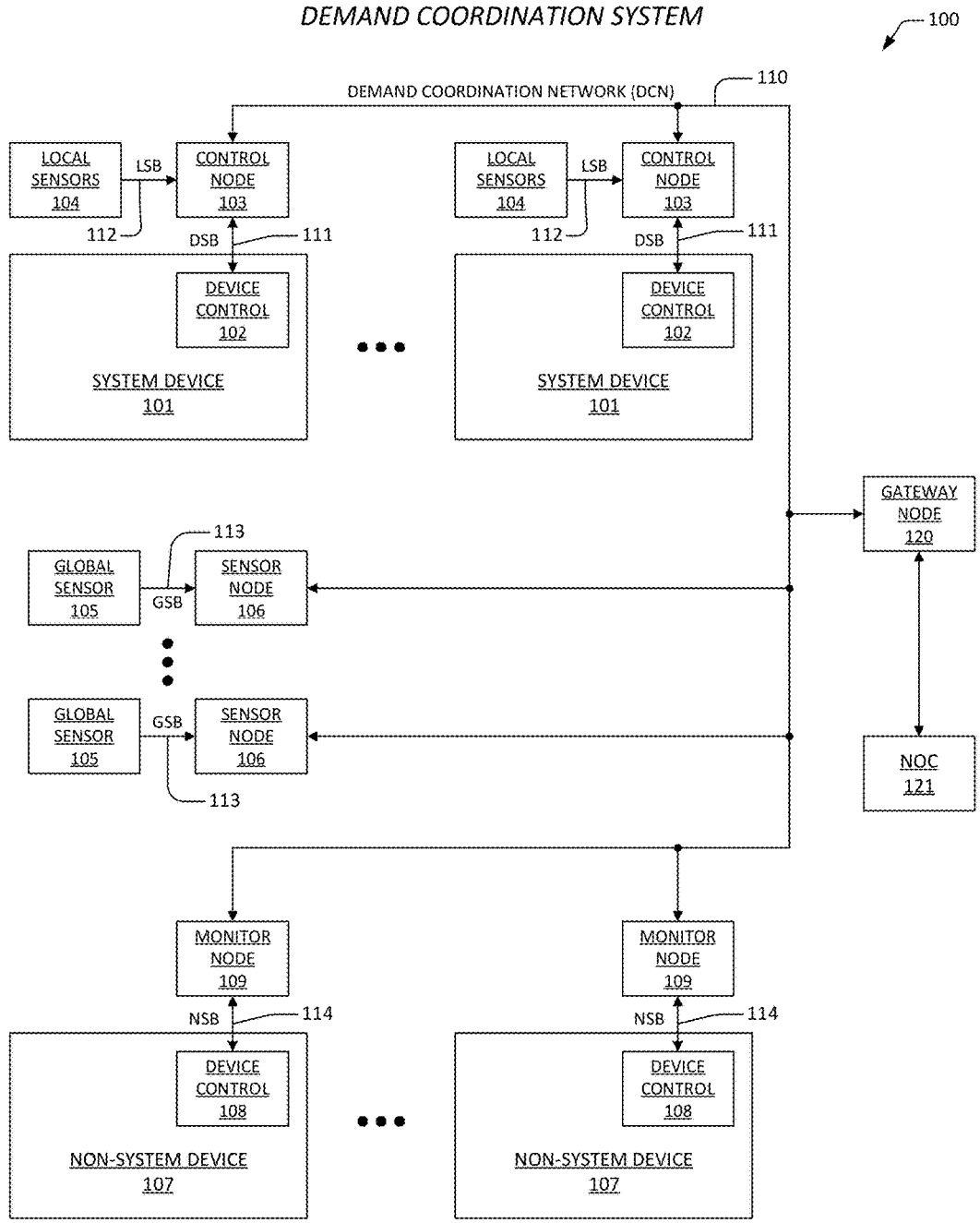
FIG. 1 is a block diagram illustrating a demand coordination system according to the present invention.

Exemplary and illustrative embodiments of the invention are described below. In the interest of clarity, not all features of an actual implementation are described in this specification, for those skilled in the art will appreciate that in the development of any such actual embodiment, numerous implementation-specific decisions are made to achieve specific goals, such as compliance with system related and/or business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In view of the above background discussion on resource and energy demand and associated techniques employed within systems to control peak demand, a discussion of the present invention will now be presented with reference to FIGS. 1-15. The present invention provides for more flexible and optimal management and control of resource consumption, such as electrical energy, by enabling use of particular resources to be coordinated among resource consuming devices. In stark contrast to prior art mechanisms, the present invention employs scheduling techniques that allow for advancement, or preemptive cycling of devices, as well as deferral. In addition, the present invention utilizes the transient energy response of a building when developing schedules for devices therein.

Referring to FIG. 1, a block diagram is presented illustrating a demand coordination system 100 according to the present invention. The system 100 includes a plurality of system devices 101, each of which is managed and controlled within the system 100 for purposes of consumption control in order to manage peak resource demand. In one embodiment, the system devices 101 may include air-conditioning units that are disposed within a building or other facility, and the resource that is managed may comprise electrical power. In another embodiment, the system devices 101 may comprise heating units that are disposed within a building or other facility, and the resource that is managed may comprise natural gas. The present inventors specifically note that the system 100 contemplated herein is intended to be preferably employed to control any type of resource consuming device 101 such as the units noted above, and also including, but not limited to, water pumps, heat exchangers, motors, generators, light fixtures, electrical outlets, sump pumps, furnaces, or any other device that is capable of being duty-cycle actuated in order to reduce peak demand of a corresponding resource, but which is also capable, in one embodiment, of maintaining a desired level of performance ("comfort level") by advancing or deferring actuation times and increasing or decreasing duty cycles in coordination with other associated devices 101. For purposes of the present application, the term "comfort level" may also connote an acceptable level of performance for a device 101 or machine that satisfies overall constraints of an associated system 100. The present inventors also note that the present invention comprehends any form of consumable resource including, but not limited to, electrical power, natural gas, fossil fuels, water, and nuclear power. As noted above, present day mechanisms are in place by energy suppliers to levy peak demand charges for the consumption of electrical power by a consumer and, going forward, examples will be discussed in terms relative to the supply, consumption, and demand coordination of electrical power for purposes only of teaching the present invention in well-known subject contexts. However, it is noted that any of the examples discussed herein may be also embodied to employ alternative devices 101 and resources as noted above for the coordination of peak demand of those resources within a system 100. It is further noted that the term "facility" is not to be restricted to construe a brick and mortar structure, but may also comprehend any form of interrelated system 100 of devices 101 whose performance can be modeled and whose actuations can be scheduled and controlled in order to control and manage the demand of a particular resource.

Having noted the above, each of the devices 101 includes a device control 102 that operates to turn the device 101 on, thus consuming a resource, and off, thus not consuming the resource. When the device 101 is off, a significant amount of the resource is consumed, and thus a device that is off does not substantially contribute to overall cumulative peak resource demand. Although implied by block diagram, the present inventors note that the device control 102 also may not be disposed within the device 101, and the device control 102 may not be collocated with the device 101 as, for example, in the case of a remote control.

A control node 103 according to the present invention is coupled to each of the device controls 102 via a device sense bus DSB 111 that is employed by the control node 103 to turn the device 101 on and off, to sense when the device 101 is turned on and off, and to further transparently enable the device 101 to operate independent of the demand coordination system 100 in a fail safe mode while at the same time sensing when the device 101 is turned on and turned off in the fail safe mode. Each of the control nodes 103 maintains control of their respective device 101 and in addition maintains a replicated copy of a global model of a system environment along with a global schedule for actuation of all of the devices 101 in the system 100. Updates to the global model and schedule, along with various sensor, monitor, gateway, configuration, and status messages are broadcast over a demand coordination network (DCN) 110, which interconnects all of the control nodes 103, and couples these control nodes to optional global sensor nodes 106, optional monitor nodes 109, and an optional gateway node 120. In one embodiment, the DCN 110 may comprise an IEEE 802.15.4 packetized wireless data network as is well understood by those skilled in the art. Alternatively, the DCN 110 may be embodied as an IEEE 802.11 packetized wireless or wired network. In another embodiment, the DCN 110 may comprise a power line modulated network comporting with HOMEPLUG® protocol standards. Other packetized network configurations are additionally contemplated, such as a BLUETOOTH® low power wireless network. The present inventors note, however, that the present invention is distinguished from conventional "state machine" techniques for resource demand management and control in that only model updates and schedule updates are broadcast over the DCN 110, thus providing a strong advantage according to the present invention in light of network disruption. For the 802.15.4 embodiment, replicated model and schedule copies on each control node 103 along with model and schedule update broadcasts according to the present invention are very advantageous in the presence of noise and multipath scenarios commonly experienced by wireless packetized networks. That is, a duplicate model update message that may be received by one or more nodes 103 does not serve to perturb or otherwise alter effective operation of the system 100.

Zero or more local sensors 104 are coupled to each of the control nodes 103 via a local sensor bus 112, and configuration of each of the local sensors 104 may be different for each one of the devices 101. Examples of local sensors 104 include temperature sensors, flow sensors, light sensors, and other sensor types that may be employed by the control node 103 to determine and model an environment that is local to a particular system device 101. For instance, a temperature sensor 104 may be employed by a control node 103 to sense the temperature local to a particular device 101 disposed as an air-conditioning unit. Another unit may employ local sensors 104 comprising both a temperature and humidity sensor local to a device 101 disposed as an air-conditioning unit. Other examples abound. Other embodiments contemplate collocation of local sensors 104 and device control 102 for a device 101, such as the well known thermostat.

The system 100 also optionally includes one or more global sensors 105, each of which is coupled to one or more sensor nodes 106 according to the present invention. The global sensors 105 may comprise, but are not limited to, occupancy sensors (i.e., movement sensors), solar radiation sensors, wind sensors, precipitation sensors, humidity sensors, temperature sensors, power meters, and the like. The sensors 105 are configured such that their data is employed to globally affect all modeled environments and schedules. For example, the amount of solar radiation on a facility may impact to each local environment associated with each of the system devices 101, and therefore must be considered when developing a global model of the system environment. In one embodiment, the global model of the system environment is an aggregate of all local models associated with each of the devices, where each of the local models are adjusted based upon the data provided by the global sensors 105.

Each of the global sensors 105 is coupled to a respective sensor node 106 according to the present invention via a global sensor bus (GSB) 113, and each of the sensor nodes 106 are coupled to the DCN 110. Operationally, the sensor nodes 106 are configured to sample their respective global sensor 105 and broadcast changes to the sensor data over the DCN 110 to the control nodes 110 and optionally to the gateway node 120.

The system 100 also optionally includes one or more non-system devices 107, each having associated device control 108 that is coupled to a respective monitor node 109 via a non-system bus (NSB) 114. Each of the monitor nodes 109 is coupled to the DCN 110. Operationally, each monitor node 109 monitors the state of its respective non-system device 107 via its device control 108 to determine whether the non-system device 107 is consuming the managed resource (i.e., turned on) or not (i.e., turned off). Changes to the status of each non-system device 107 are broadcast by its respective monitor node 109 over the DCN 110 to the control nodes 103 and optionally to the gateway node 120. The non-system devices 107 may comprise any type of device that consumes the resource being managed, but which is not controlled by the system 100. One example of such a non-system device 107 is an elevator in a building. The elevator consumes electrical power, but may not be controlled by the system 100 in order to reduce peak demand. Thus, in one embodiment, consumption of the resource by these non-system devices 107 is employed as a factor during scheduling of the system devices 101 in order to manage and control peak demand of the resource.

Optionally, the gateway node 120 is coupled by any known means to a network operations center (NOC) 121. In operation, configuration data for the system 100 may be provided by the NOC 121 and communicated to the gateway node 120. Alternatively, configuration data may be provided via the gateway node 120 itself. Typically, the gateway node 120 is collocated with the system 100 whereas the NOC 121 is not collocated and the NOC 121 may be employed to provide configuration data to a plurality of gateway nodes 120 corresponding to a plurality of systems 100. The configuration data may comprise, but is not limited to, device control data such as number of simultaneous devices in operation, device operational priority relative to other devices, percentage of peak load to employ, peak demand profiles related to time of day, and the like.

Thus, as will be described in more detail below, each of the control nodes 103 develops a local environment model that is determined from corresponding local sensors 104. Each local environment model, as changes to the local environment model occur, is broadcast over the DCN 110 to all other control nodes 103. Each of the control nodes 103 thus maintains a global environmental model of the system 100 which, in one embodiment, comprises an aggregation of all of the local environmental models. Each of the global models is modified to incorporate the effect of data provided by the global sensors 105. Thus, each identical global model comprises a plurality of local environmental models, each of which has been modified due to the effect of data provided by the global sensors 105. It is important to note that the term "environmental" is intended to connote a modeling environment which includes, but is not limited to, the physical environment.

Each control node 103, as will be described below, additionally comprises a global schedule which, like the global model, is an aggregate of a plurality of local run time schedules, each associated with a corresponding device 101. The global schedule utilizes the global model data in conjunction with configuration data and data provided by the monitor nodes 109, to develop the plurality of local run time schedules, where relative start times, duration times, and duty cycle times are established such that comfort margins associated with each of the local environments are maintained, in one embodiment, via maintaining, advancing (i.e., running early), or deferring (i.e., delaying) their respective start times and durations, and via maintaining, advancing, or deferring their respective duty cycles.

Figure 2:
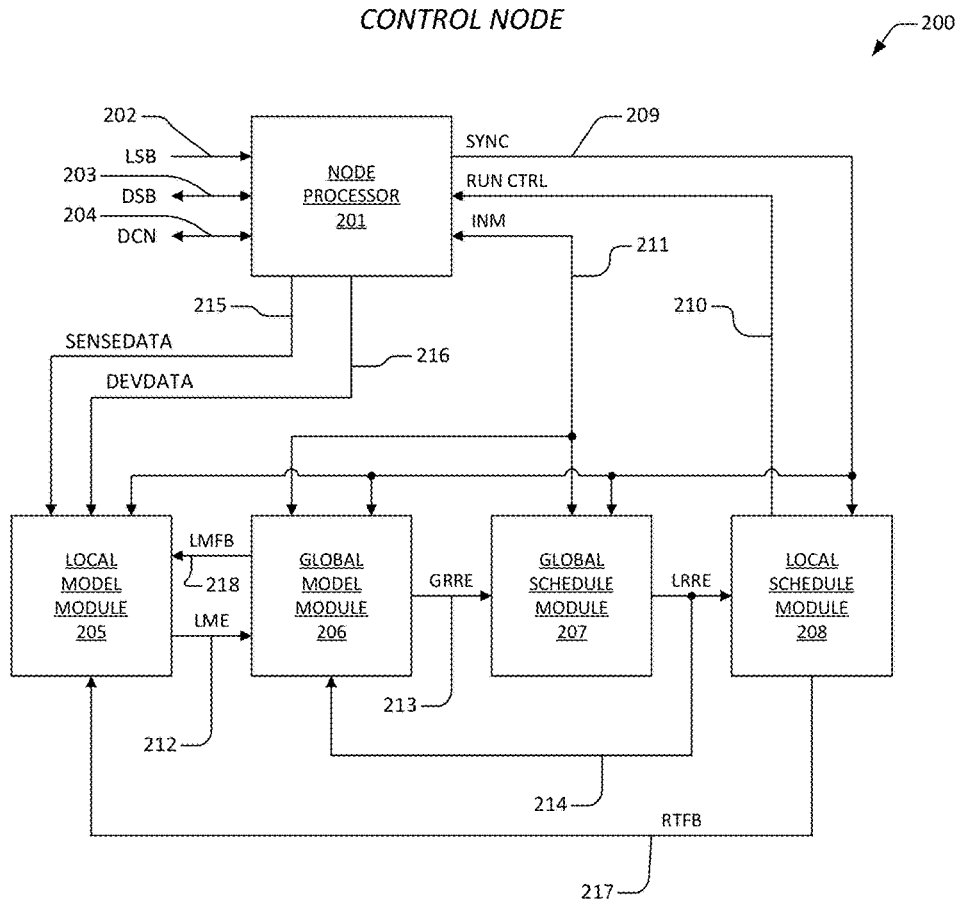
FIG. 2 is a block diagram depicting a control node according to the present invention.

Turning now to FIG. 2, a block diagram is presented depicting a control node 200 according to the present invention. The control node 200 includes a node processor 201 that is coupled to one or more local sensors (not shown) via a local sensor bus (LSB) 202, a device control (not shown) via a device sense bus (DSB) 203, and to a demand coordination network (DCN) 204 as has been described above with reference to FIG. 1.

The control node 200 also includes a local model module 205 that is coupled to the node processor 201 via a synchronization bus (SYNC) 209, a sensor data bus (SENSEDATA) 215, and a device data bus (DEVDATA) 216. The control node 200 also has a global model module 206 that is coupled to the node processor 201 via SYNC 209 and via an inter-node messaging bus (INM) 211. The global model module 206 is coupled to the local model module 205 via a local model environment bus (LME) 212. The control node 200 further includes a global schedule module 207 that is coupled to the node processor 201 via SYNC 209 and INM 211, and that is coupled to the global model module 206 via a global relative run environment bus (GRRE) 213. The control node finally includes a local schedule module 208 that is coupled to the node processor 201 via SYNC 209 and a run control bus (RUN CTRL) 210. The local schedule module 208 is also coupled to the global schedule module 207 via a local relative run environment bus (LRRE) 214. LRRE 214 is also coupled to the global model module 206. In addition, a run time feedback bus (RTFB) 217 couples the local schedule module 208 to the local model module 205.

The node processor 201, local model module 205, global model module 206, global schedule model 207, and local schedule model 208 according to the present invention are configured to perform the operations and functions as will be described in further detail below. The node processor 201 local model module 205, global model module 206, global schedule model 207, and local schedule model 208 each comprises logic, circuits, devices, or microcode (i.e., micro instructions or native instructions), or a combination of logic, circuits, devices, or microcode, or equivalent elements that are employed to perform the operations and functions described below. The elements employed to perform these operations and functions may be shared with other circuits, microcode, etc., that are employed to perform other functions within the control node 200. According to the scope of the present application, microcode is a term employed to refer to one or more micro instructions.

In operation, synchronization information is received by the node processor 201. In one embodiment, the synchronization information is time of day data that is broadcast over the DCN 204. In an alternative embodiment, a synchronization data receiver (not shown) is disposed within the node processor 201 itself and the synchronization data includes, but is not limited to, atomic clock broadcasts, a receivable periodic synchronization pulse such as an amplitude modulated electromagnetic pulse, and the like. The node processor 201 is further configured to determine and track relative time for purposes of tagging events and the like based upon reception of the synchronization data. Preferably, time of day is employed, but such is not necessary for operation of the system.

The node processor 201 provides periodic synchronization data via SYNC 209 to each of the modules 205-208 to enable the modules 205-208 to coordinate operation and to mark input and output data accordingly. The node processor 201 also periodically monitors data provided by the local sensors via LSB 202 and provides this data to the local model module 205 via SENSEDATA 215. The node processor 201 also monitors the DSB 203 to determine when an associated device (not shown) is turned on or turned off. Device status is provided to the local model module 205 via DEVDATA. The node processor 201 also controls the associated device via the DSB 203 as is directed via commands over bus RUN CTRL 210. The node processor further transmits and receives network messages over the DCN 204. Received message data is provided to the global model module 206 or the global schedule model 207 as appropriate over bus INM 211. Likewise, both the global model module 206 and the global schedule model 207 may initiate DCN messages via commands over bus INM 211. These DCN messages primarily include, but are not limited to, broadcasts of global model updates and global schedule updates. System configuration message data as described above is distributed via INM 211 to the global schedule module 207.

Periodically, in coordination with data provided via SYNC 209, the local model module employs sensor data provided via SENSEDATA 215 in conjunction with device actuation data provided via DEVDATA 216 to develop, refine, and update a local environmental model which comprises, in one embodiment, a set of descriptors that describe a relative time dependent flow of the local environment as a function of when the associated device is on or off. For example, if the device is an air conditioning unit and the local sensors comprise a temperature sensor, then the local model module 205 develops, refines, and updates a set of descriptors that describe a local temperature environment as a relative time function of the data provided via SYNC 209, and furthermore as a function of when the device is scheduled to run and the parameters associated with the scheduled run, which are received from the local schedule module 208 via RTFB 217. This set of descriptors is provided to the global model module 206 via LME 212. However, it is noted that these descriptors are updated and provided to LME 212 only when one or more of the descriptors change to the extent that an error term within the local model module 205 is exceeded. In addition to the descriptors, data provided on LME 212 by the local model module includes an indication of whether the descriptors accurately reflect the actual local environment, that is, whether the modeled local environment is within an acceptable error margin when compared to the actual local environment. When the modeled local environment exceeds the acceptable error margin when compared to the actual local environment, then the local model module 205 indicates that its local environment model is inaccurate over LME 212, and the system may determine to allow the associated device to run under its own control in a fail safe mode. For instance, if occupancy of a given local area remains consistent, then a very accurate model of the local environment will be developed over a period of time, and updates of the descriptors 212 will decrease in frequency, thus providing advantages when the DCN 204 is disrupted. It is noted that the error term will decrease substantially in this case. However, consider a stable local environment model that is continually perturbed by events that cannot be accounted for in the model, such as impromptu gatherings of many people. In such a case the error term will be exceeded, thus causing the local model module 205 to indicate over LME 212 that its local environment model is inaccurate. In the case of a system comprising air conditioning units, it may be determined to allow the associated unit to run in fail safe mode, that is, under control of its local thermostat. Yet, advantageously, because all devices continue to use their replicated copies of global models and global schedules, the devices continue to operate satisfactorily in the presences of disruption and network failure for an extended period of time. Additionally, if model error over time is known, then all devices in the network can utilize pre-configured coordination schedules, effectively continuing coordination over an extended period of time, in excess of the models ability to stay within a known margin of error. Furthermore, it can be envisioned that devices without a DCN, utilizing some externally sensible synchronization event, and with known model environments, could perform coordination sans DCN.

The local model module 205, in addition to determining the above noted descriptors, also maintains values reflecting accuracy of the local sensors, such as hysteresis of a local thermostat, and accounts for such in determining the descriptors. Furthermore, the local model module 205 maintains and communicates via LME 212 acceptable operation margin data to allow for advancement or deferral of start times and durations, and increase or decrease of duty cycles. In an air conditioning or heating environment, the acceptable operation margin data may comprise an upper and lower temperature limit that is outside of the hysteresis (set points) of the local temperature sensor, but that is still acceptable from a human factors perspective in that it is not noticeable to a typical person, thus not adversely impacting that person's productivity. In addition, the local model module 205 may maintain values representing a synthesized estimate of a variable (for example, temperature). In another embodiment, the local model module 205 may maintain synthesized variables representing, say, comfort, which are a function of a combination of other synthesized variables including, but not limited to, temperature, humidity, amount of light, light color, and time of day.

In one embodiment, the descriptors comprise one or more coefficients and an offset associated with a linear device on-state equation and one or more coefficients and intercept associated with a linear device off-state equation. Other equation types are contemplated as well to include second order equations, complex coefficients, or lookup tables in the absence of equation-based models. What is significant is that the local model module generates and maintains an acceptable description of its local environment that is relative to a synchronization event such that the global model module 206 can predict the local environment as seen by the local model module.

The global model module 206 receives the local descriptors via LME 212 and stores this data, along with all other environments that are broadcast over the DCN and received via the INM 211. In addition, the global model module adjusts its corresponding local environment entry to take into account sensor data from global sensors (e.g., occupancy sensors, solar radiation sensors) which is received over the DCN 204 and provided via the INM 211. An updated local entry in the global model module 206 is thus broadcast over the DCN 204 to all other control nodes in the system and is additionally fed back to the local model module to enable the local model module to adjust its local model to account for the presence of global sensor data.

The global model module 206 provides all global model entries to the global schedule module 207 via GRRE 213. The global schedule module 207 employs these models to determine when and how long to actuate each of the devices in the system. In developing a global device schedule, the global schedule module utilizes the data provided via GRRE 213, that is, aggregate adjusted local models for the system, along with system configuration data as described above which is resident at installation or which is provided via a broadcast over the DCN 204 (i.e., a NOC-initiated message over the gateway node). The global device actuation schedule refers to a schedule of operation relative to the synchronization event and is broadcast over the DCN 204 to all other control nodes. In addition, the device actuation schedule associated with the specific control node 200 is provided over LRRE 214 to both the local schedule module 208 and the local model module, for this data directs if and when the device associated with the specific control node 200 will run. It is noted that the global schedule module 207 operates substantially to reduce peak demand of the system by advancing or deferring device start times and increasing or decreasing device duty cycles in accordance with device priorities. The value by which a time is advanced or deferred and the amount of increase or decrease to a duty cycle is determined by the global schedule module 207 such that higher priority devices are not allowed to operate outside of their configured operational margin. In addition, priorities, in one embodiment, are dynamically assigned by the global schedule module 207 based upon the effect of the device's timing when turned on. Other mechanisms are contemplated as well for dynamically assigning device priority within the system.

The local schedule module 208 directs the associated device to turn on and turn off at the appropriate time via commands over RUN CTRL 210, which are processed by the node processor 201 and provided to the device control via DSB 203.

Figure 3:
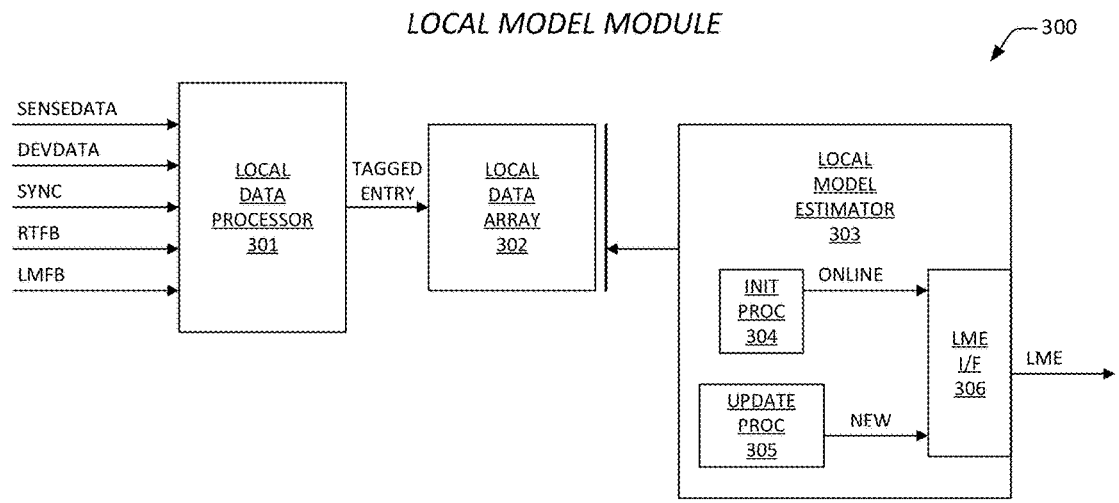
FIG. 3 is a block diagram featuring a local model module according to the present invention, such as might be disposed within the control node of FIG. 2.

Now referring to FIG. 3, a block diagram is presented featuring a local model module 300 according to the present invention, such as might be disposed within the control node 200 of FIG. 2. As is described above with reference to FIG. 2, the local model module 300 performs the function of developing, updating, and maintaining an acceptably accurate model of the local environment. Accordingly, the local model module 300 includes a local data processor 301 that is coupled to busses SENSEDATA, DEVDATA, SYNC, and RTFB. Data associated with the local environment is stamped relative to the synchronization data provided via SYNC and entries are provided to a local data array 302 via a tagged entry bus TAGGED ENTRY. The local model module 300 also includes a local model estimator 303 that is coupled to the local data array 302 and which reads the tagged entries and develops the descriptors for the local environment when the device is on an when the device is off, as described above. The local model estimator 303 include an initiation processor 304 that is coupled to an LME interface 306 via bus ONLINE and an update processor 305 that is coupled to the LME interface 306 via bus NEW. The LME interface 306 generates data for the LME bus.

In operation, the local data processor 301 monitors SENSEDATA, DEVDATA, and RTFB. If data on any of the busses changes, then the local data processor 301 creates a tagged entry utilizing time relative to data provided via SYNC and places the new tagged entry into the local data array 302. Periodically, the local model estimator 303 examines the entries in the local data array 302 and develops the descriptors described above. The period at which this operation is performed is a function of the type of devices in the system. In one embodiment, development of local environment model descriptors is performed at intervals ranging from 1 second to 10 minutes, although one skilled in the art will appreciate that determination of a specific evaluation interval time is a function of device type, number of devices, and surrounding environment. The update processor 305 monitors successive evaluations to determine if the value of one or more of the descriptors changes as a result of the evaluation. If so, then the update processor 305 provides the new set of descriptors to the LME interface 306 via bus NEW.

The initialization processor 304 monitors the accuracy of the modeled local environment as compared to the real local environment. If the accuracy exceeds an acceptable error margin, then the initialization processor 304 indicates such via bus ONLINE and the LME interface 306 reports this event to the global model module (not shown) via bus LME. As a result, the local device may be directed to operate in fail safe mode subject to constraints and configuration data considered by the global schedule module (not shown). In another embodiment, if the error margin is exceeded, the local device may not necessarily be directed to operate in fail safe mode. Rather, exceeding the error margin may only be used as an indicator that the actual conditions and the modeled view of those conditions are sufficiently disparate such that a process is triggered to develop a new equation, algorithm or model component that better describes the actual environment. Explained another way, the error margin triggers an iterative process that refines the model. Stated differently, as the model correlates more closely to actual conditions, the process runs less frequently, and model updates occur (locally and remotely) less frequently. Advantageously, the initialization processor 304 enables a control node according to the present invention to be placed in service without any specific installation steps. That is, the control node is self-installing. In one embodiment, as the local model module learns of the local environment, the initialization processor 304 indicates that the error margin is exceeded and as a result the local device will be operated in fail safe mode, that is, it will not be demand controlled by the system. And when development of the local model falls within the error margin, the initialization processor 304 will indicate such and the local device will be placed online and its start times and durations will be accordingly advanced or deferred and its duty cycle will be increased or decreased, in conjunction with other system devices to achieve the desired level of peak demand control.

Figure 4:
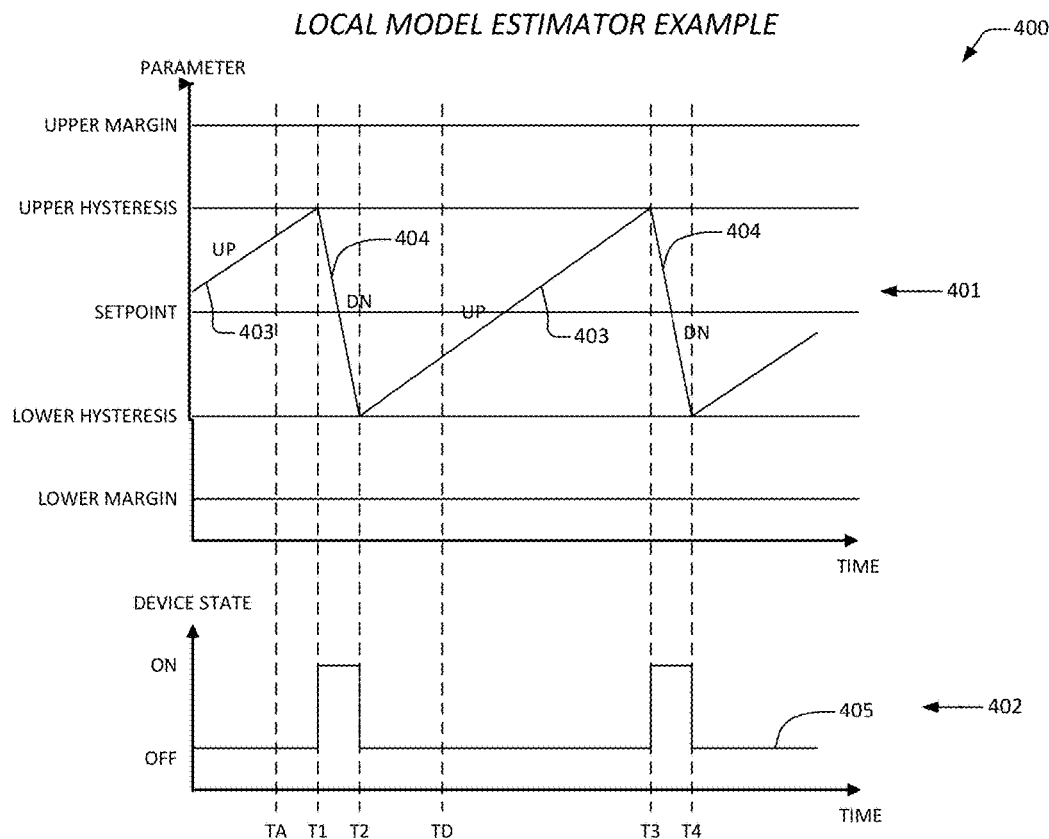
FIG. 4 is a timing diagram showing an exemplary local model estimation performed by the local model module of FIG. 3.

Turning to FIG. 4, a timing diagram 400 is presented showing an exemplary local model estimation performed by the local model module of FIG. 3. The diagram 400 includes two sections: a parameter estimation section 401 and a device state section 402. The parameter estimation section 401 shows a setpoint for the device along with upper and lower hysteresis values. In some devices, hysteresis is related to the accuracy of the local sensor. In other devices, hysteresis is purposely built in to preclude power cycling, throttling, oscillation, and the like. In a cooling or heating unit, the hysteresis determines how often the device will run and for how long. The parameter estimation section 401 also shows an upper operational margin and a lower operational margin, outside of which the local device is not desired to operate. The parameter estimation section 401 depicts an estimated device off line (UP) 403 that is the result of applying estimated descriptors over time for when the device is turned off, and an estimated device on line (DN) 404 that is the result of applying estimated descriptors over time for when the device is turned on. One area of demand control where this example is applicable is for a local air conditioning unit that is controlled by a local thermostat. Accordingly, the local data processor 301 provides tagged entries to the local data array 302 as noted above. Device status (on or off) is provided either directly from DEVDATA bus or indirectly from RTFB (if DEVDATA is incapable of determining on and off state). The entries corresponding to each of the two states are evaluated and a set of descriptors (i.e., parameters) are developed that describe the local environment. In one embodiment, a linear fit algorithm is employed for the on time and off time of the device. By using device status 405, the local model estimator 303 can determine descriptors for UP 403, DN 404, and the upper and lower hysteresis levels. Upper and lower margin levels are typically provided as configuration data and may vary from installation to installation. In the air conditioning example, the parameter being estimated is local temperature and thus the upper and lower margins would vary perhaps two degrees above and below the hysteresis levels. Note that prior to time T1, the device is off and the parameter, as indicated by local sensor data, is increasing. At time T1 the device turns on, subsequently decreasing the parameter. At time T2, the device turns off and the parameter begins increasing in value. At time T3 the device turns on again and the parameter decreases. At time T4, the device turns off and the parameter increases.

By determining the descriptors and knowing the upper and lower margins, a global scheduler is enabled to determine how long it can advance (point TA) or delay (point TD) a start time, for example. In addition, the descriptors developed by the local model for the operational curves 403, 404, as adjusted by the global model module, enable a global scheduler to advance or defer start and/or duration, or increase or decrease duty cycle of the device in a subsequent cycle in order to achieve the desired peak demand control while maintaining operation of the device within the upper and lower margin boundaries. Advantageously, the model according to the present invention is configured to allow for estimation of the precise position in time of the device on the curves 403, 404, which enables, among other features, the ability of the system to perform dynamic hysteresis modification, or overriding intrinsic hysteresis of a device. In addition, the initialization processor 304 can monitor the actual environment from local sensor data and compare it to the curves 403, 404 to determine if and when to place the device online for demand control. The descriptors that describe the UP segment 403 and DN segment 404 are communicated to the global model module via bus LME.

Figure 5:
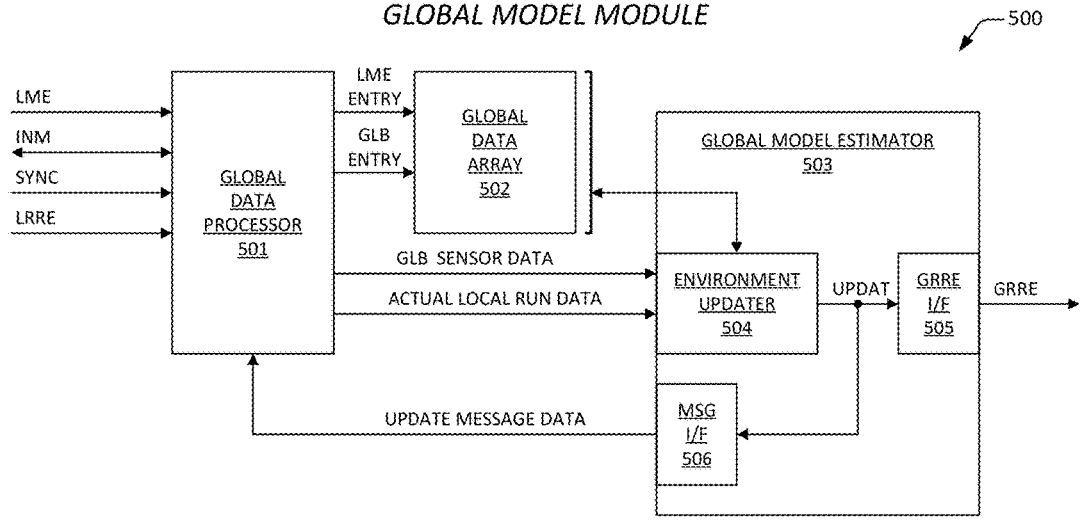
FIG. 5 is a block diagram illustrating a global model module according to the present invention, such as might be disposed within the control node of FIG. 2.

Now referring to FIG. 5, a block diagram illustrating a global model module 500 according to the present invention, such as might be disposed within the control node 200 of FIG. 2. As is noted in the discussion with reference to FIG. 2, the global model module 500 performs two functions. First, the global model module 500 adjusts the descriptors associated with the local environment as provided over bus LME to account for global sensor data provided via messages broadcast for global sensor nodes over the demand control network. Secondly, the global model module stores replica copies of all other local environment descriptors in the system, as each of those local environment descriptors have been adjusted by their respective global model modules.

The global model module 500 includes a global data processor 501 that receives local descriptors and other data via bus LME from its corresponding local model module. In addition, the global data processor 501 interfaces to busses INM, SYNC, and LRRE to receive/transmit data as described above. Local descriptors are stamped and entered into a global data array 502 via bus LME entry. The remaining adjusted local descriptors from other devices are received via bus INM and are entered into the global data array 502 via bus GLB entry.

A global model estimator 503 is coupled to the global data array 502 and to the global data processor 501 via busses GLB SENSOR DATA, ACTUAL LOCAL RUN DATA, and UPDATE MESSAGE DATA. Global sensor data that is received over INM is provided to the estimator 503 via GLB SENSOR DATA. Actual run time data for the corresponding local device that is received over bus LRRE is provided to the estimator 503 via ACTUAL LOCAL RUN DATA.

In operation, the global model estimator 503 retrieves its corresponding local environment descriptor entry from the global data array 502. The global model estimator 503 includes an environment updater 504 that modifies the local descriptor retrieved from the array to incorporate the effects of global sensor data provided over GLB SENSOR DATA. For example, the value of an external building temperature sensor is a parameter that would affect every local temperature descriptor set in the system. The environment updater 504 modifies its local descriptor set to incorporate any required changes due to global sensor values. In addition, the environment updater 504 employs the actual run data of the associated device to enable it to precisely determine at what point on the estimated local environmental curve that it is at when modifying the local descriptors.

If the environment updater 504 modifies a local descriptor set, its corresponding entry in the array 502 is updated and is provided to a messaging interface 506 and to a GRRE interface. The messaging interface 506 configures update message data and provides this data via UPDATE MESSAGE DATA to the processor 501 for subsequent transmission over the DCN. The GRRE interface 505 provides the updated local environment descriptor set to bus GRRE. All operations are performed relative to synchronization event data provided via SYNC.

Figure 6:
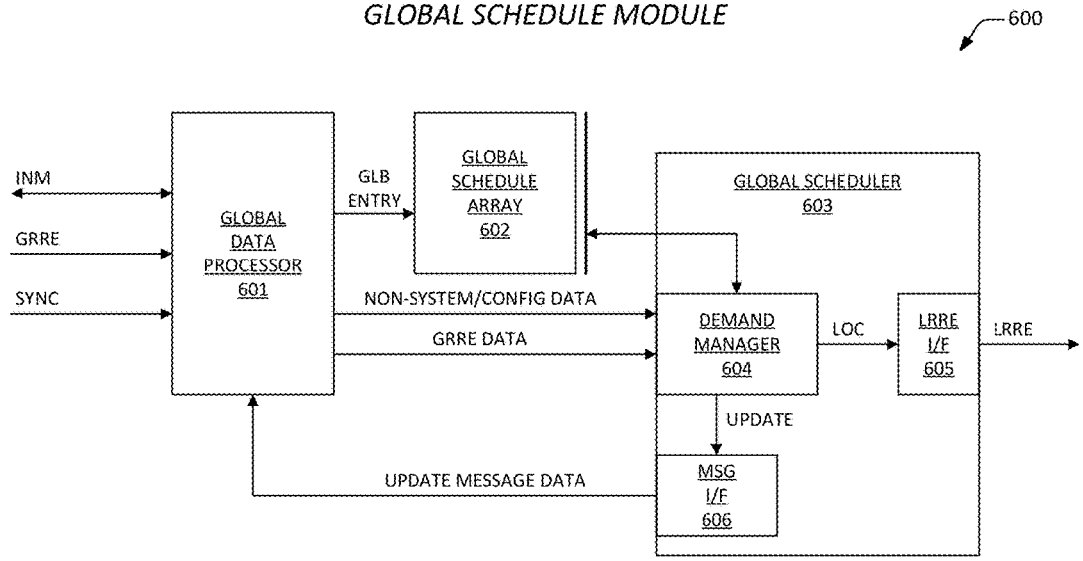
FIG. 6 is a block diagram detailing a global schedule module according to the present invention, such as might be disposed within the control node of FIG. 2.

Turning to FIG. 6, a block diagram is presented detailing a global schedule module 600 according to the present invention, such as might be disposed within the control node 200 of FIG. 2. As described above, the global schedule module 600 is responsible for determining a schedule of operation (turn on, duration, and duty cycle) for each of the devices in the system. When the local environment descriptors are updated by a coupled global model module and are received over bus GRRE, then the global schedule module 600 operates to revise the global schedule of device operation and to broadcast this updated schedule over the DCN.

The global schedule module 600 includes a global data processor 601 that interfaces to INM for reception/transmission of DCN related data, bus GRRE for reception of updated local environment descriptors, and bus SYNC for reception of synchronization event data. DCN data that is provided to the global schedule module 600 includes broadcast global schedules from other control nodes, and non-system device data and configuration data as described above. The global data processor 601 provides updated global schedule data, received over the DCN from the other control nodes, to a global schedule array 602 via bus GLB ENTRY. The global processor 601 is coupled to a global scheduler 603 via bus NON-SYSTEM/CONFIG DATA for transmittal of the non-system device data and configuration data. The global processor 601 is also coupled to the global scheduler 603 via bus GRRE data for transmittal of updated local environment descriptors provided via bus GRRE. And the global scheduler 603 is coupled to the processor 601 via bus UPDATE MESSAGE DATA to provide INM data resulting in DCN messages that broadcast an updated global schedule generated by this module 600 to other control nodes in the system.

The global scheduler 603 includes a demand manager 604 that is coupled to an LRRE interface 605 via bus LOC and to a messaging interface 606 via bus UPDATE. When data is received over either the NON-SYSTEM/CONFIG DATA bus or the GRRE data bus, the demand manager recalculates a global relative run schedule for all devices in the system. The schedule for an individual device includes, but is not limited to, a relative start time, a duration, and a duty cycle. The relative start time and/or duration may be advanced, maintained, or deferred in order to achieve configured constraints of the system in conjunction with the operation of non-system devices and the amount of resource that they consume. In addition, for similar purposes the duty cycle for each device in the system may be increased or decreased. Yet, as one skilled will appreciate, the system accounts for limits to devices duty cycle modification to prevent unintended damage to a device. The result is an updated global schedule, which is stored in the array 602, and which is broadcast via update messages over the DCN provided via bus UPDATE. In addition, the relative run schedule for the corresponding local device is provided via bus LOC to the LRRE interface 605, and which is placed on bus LRRE for transmission to a corresponding local schedule module.

Figure 7:
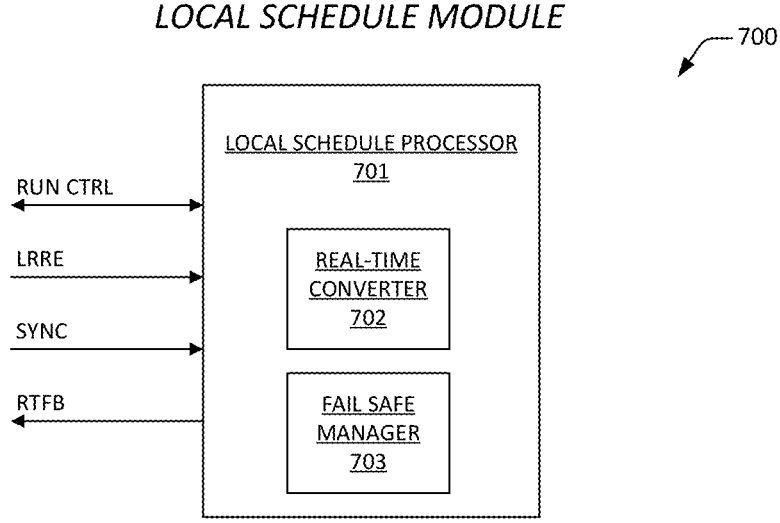
FIG. 7 is a block diagram showing a local schedule module according to the present invention, such as might be disposed within the control node of FIG. 2.

FIG. 7 is a block diagram showing a local schedule module 700 according to the present invention, such as might be disposed within the control node 200 of FIG. 2. The local schedule module 700 includes a local schedule processor 701 that is coupled to bus RUN CTRL, bus LRRE, bus SYNC, and bus RTFB. The local schedule processor 701 includes a real-time converter 702 and a fail safe manager 703.

In operation, the local schedule processor 701 receives an updated local run schedule for its associated device. The real-time converter establishes an actual run time for the device based upon the synchronization data provided via SYNC and the relative run time data received over LRRE. This real-time data is provided to a corresponding local model module via bus RTFB to enable the local model module to establish device on/off times in the absence of the device's ability to provide that data itself. Accordingly, the processor 701 directs the device to turn on and turn off via commands over RUN CTRL in comport with the actual run time schedule. In the event that the LRRE includes an indication that the local model is not within an acceptable error range, as described above, the fail safe manager 703 directs the device via RUN CTRL to operate independently.

Figure 8:
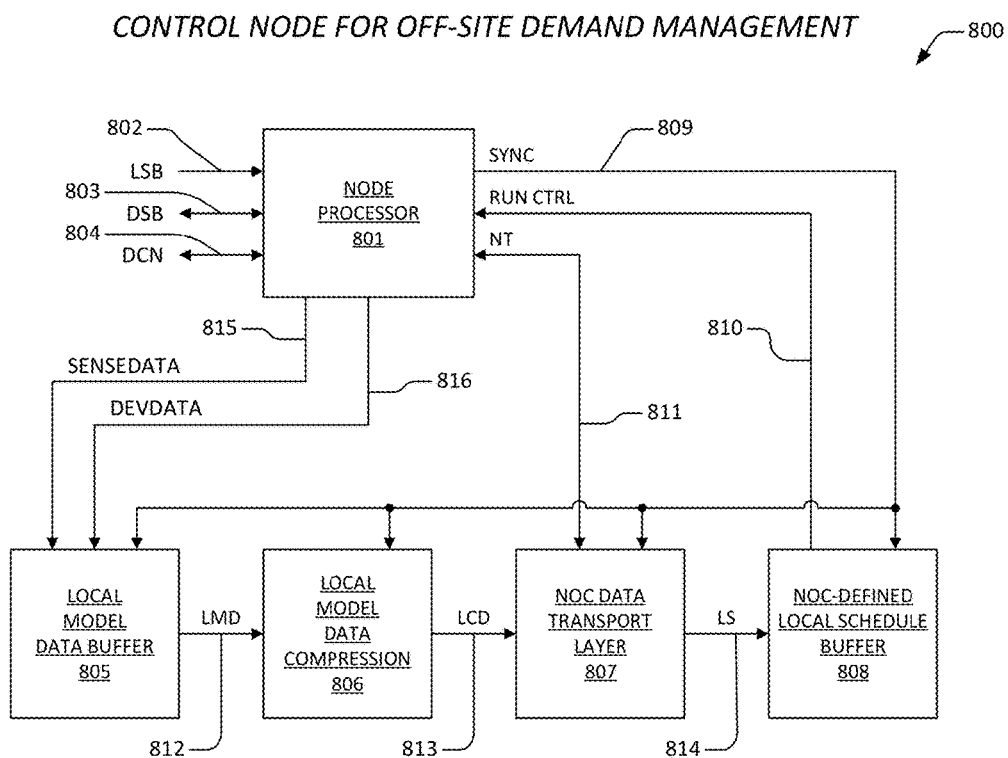
FIG. 8 is a block diagram depicting an alternative embodiment of a control node according to the present invention for use in a NOC-oriented demand coordination system.

Turning now to FIG. 8, a block diagram is presented depicting an alternative embodiment of a control node 800 according to the present invention. The control node 800 may be employed in a configuration of the system of FIG. 1 where algorithms associated with demand management and coordination are performed off-site, that is, by a NOC 121 that is configured to execute all of the modeling and scheduling functions associated with each of the control nodes 103 in the demand coordination system 100, taking into account data provided via the sensor nodes 106 and monitor nodes 109. Accordingly, such a configured control node 800 provides a reduced cost alternative for demand coordination over the control node 200 of FIG. 2 as a result of elimination of processing and storage capabilities that are shifted to the NOC 121.

As is described above with reference to FIGS. 1-2, each of the control nodes 103, 200 in the network retain forms of the global model that describe the entire system 100, and local schedules are generated in-situ on each node 103, 200 by a local schedule module 208. In this cost-reduced embodiment, the control nodes 800 only store their corresponding local schedules that have been generated by the NOC 121. Since these nodes 800 have a greater dependency on network availability, they execute an algorithm that selects an appropriate pre-calculated schedule, based on network availability. Accordingly, the control nodes 800 according to the NOC-oriented embodiment are configured to maintain operation of the system 100 during network disruptions. The algorithm utilizes a set of pre-calculated schedules along with network integrity judgment criteria used to select one of the pre-calculated schedules. The pre-calculated schedules and judgment criteria are sent to each node 800 from the NOC 121. The pre-calculated schedules for the device associated with the control node 800 are based on the latency of last communication with the NOC 121. As the latency increases, increased latency is used as an index to select an alternate schedule. This latency-indexed scheduling mechanism is configured to ensure demand-coordinated operation of the devices 101 within the system 100 even if the communication network (e.g., WAN and/or LAN) is interrupted, thus improving disruption tolerance of the overall system 100.

In lieu of processing global and local models within the system 100, a control node 800 according the NOC-oriented embodiment is configured to forward all data necessary for performing these processing operations to the NOC 121. The NOC 121 performs this processing for each of the control nodes 800 in the system 100, and the resultant local schedules are then transmitted to the control nodes 800 within the system 100 so that the demand coordination operations can continue. By reorienting the system 100 to utilize remote storage and processing disposed within the NOC 121, additional demands may be placed on the communication network utilized by the control nodes 800 within the facility, as well as any necessary LAN or WAN network needed to communication with the remote storage and processing facility. To accommodate this increased utilization of the communication network, the control nodes are configured to compress the local data that is transmitted to the NOC 121.

The control node 800 includes a node processor 801 that is coupled to one or more local sensors (not shown) via a local sensor bus (LSB) 802, a device control (not shown) via a device sense bus (DSB) 803, and to a demand coordination network (DCN) 804 as has been described above with reference to FIG. 1.

The control node 800 also includes a local model data buffer 805 that is coupled to the node processor 801 via a synchronization bus (SYNC) 809, a sensor data bus (SENSEDATA) 815, and a device data bus (DEVDATA) 816. The control node 800 also has local model data compression 806 that is coupled to the node processor 801 via SYNC 809. The local model data compression 806 is coupled to the local model data buffer 805 via a local model data (LMD) bus 812. The control node 800 further includes a NOC data transport layer 807 that is coupled to the node processor 201 via SYNC 809 and a NOC transport bus (NT) 811, and that is coupled to the local model data compression 806 via a local compressed data (LCD) bus 813. The control node 800 finally includes a NOC-defined local schedule buffer 808 that is coupled to the node processor 801 via SYNC 809 and a run control bus (RUN CTRL) 810. The local schedule buffer 808 is coupled to the transport layer 807 via a local schedule (LS) bus 814.

The control node 800 according to the present invention is configured to perform the operations and functions as will be described in further detail below. The control node 800 comprises logic, circuits, devices, or microcode (i.e., micro instructions or native instructions), or a combination of logic, circuits, devices, or microcode, or equivalent elements that are employed to perform the operations and functions described below. The elements employed to perform these operations and functions may be shared with other circuits, microcode, etc., that are employed to perform other functions within the control node 800.

In operation, synchronization information is received by the node processor 201. In one embodiment, the synchronization information is time of day data that is broadcast over the DCN 804. In an alternative embodiment, a synchronization data receiver (not shown) is disposed within the node processor 801 itself and the synchronization data includes, but is not limited to, atomic clock broadcasts, a receivable periodic synchronization pulse such as an amplitude modulated electromagnetic pulse, and the like. The node processor 801 is further configured to determine and track relative time for purposes of tagging events and the like based upon reception of the synchronization data. Preferably, time of day is employed, but such is not necessary for operation of the system.

The node processor 801 provides periodic synchronization data via SYNC 809 to each of the modules 805-808 to enable the modules 805-808 to coordinate operation and to mark input and output data accordingly. The node processor 801 also periodically monitors data provided by the local sensors via LSB 802 and provides this data to the local model data buffer 805 via SENSEDATA 815. The node processor 801 also monitors the DSB 803 to determine when an associated device (not shown) is turned on or turned off. Device status is provided to the local model data buffer 805 via DEVDATA 816. The node processor 801 also controls the associated device via the DSB 803 as is directed via commands over bus RUN CTRL 810. The node processor 801 further transmits and receives network messages over the DCN 804. Received message data is provided to the NOC transport layer 807 via NT 811.

Periodically, in coordination with data provided via SYNC 809, the local model data buffer 805 buffers sensor data provided via SENSEDATA 815 in conjunction with device actuation data provided via DEVDATA 816 and provides this buffered data periodically to the data compression 806 via LMD 812. The data compression 806 compresses the buffered data according to known compression mechanisms and provides this compressed data to the transport layer 807 via LCD 813. The transport layer 807 configures packets for transmission to the NOC 121 and provides these packets to the node processor 801 via NT 811. The node processor 801 transmits the packets to the NOC 121 over the DCN 804.

One or more compressed local schedules along with latency-based selection criteria are received from the NOC 121 via packets over the DCN 804 and are provided to the transport layer 807 over NT 811. The one or more local schedules and selection criteria are decompressed by the transport layer 807 according to known mechanisms and are provided to the local schedule buffer 808 via LS 814. As a function of transport latency to/from the NOC 122, the local schedule buffer 808 selects one or the one or more local schedules and directs the associated device to turn on and turn off at the appropriate times via commands over RUN CTRL 810, which are processed by the node processor 801 and provided to the device control via DSB 803.

Figure 9:
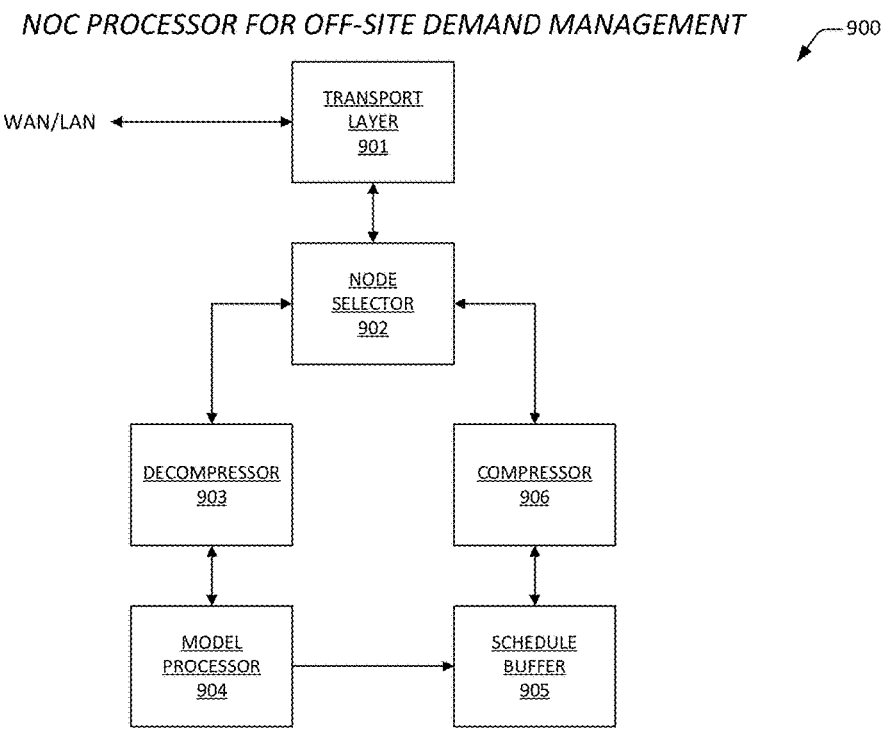
FIG. 9 is a block diagram illustrating a NOC processor for off-site demand management.

Now turning to FIG. 9, a block diagram is presented illustrating a NOC processor 900 for off-site demand management. The NOC processor 900 may be employed in a system along with control nodes 800 as discussed above with reference to FIG. 8 where all of the processing associated with the generation and maintenance of local device models and global system models is performed exclusively by the NOC. In addition to model generation and maintenance, the NOC generates one or more latency-based local schedules for each device in the system and transmits those schedules to the devices over a WAN or LAN as is discussed with reference to FIG. 1 and FIG. 8. For clarity sake, only elements essential to an understanding of the present invention are depicted.

The processor 900 may include a transport layer 901 that is coupled to the WAN/LAN. The transport layer 901 is coupled to a node selector 902. A decompressor 903 is coupled to the node selector 902 and to a model processor 904. The model processor 904 is coupled to a schedule buffer 905, which is coupled to a compressor 906. The compressor 906 is coupled to the node selector.

In operation, compressed local model data for each device in the system is received via packets transmitted over the WAN/LAN. The transport layer 901 receives the packets and provides the data to the node selector 902. The node selector 902 determines an identification for a control node 800 which provided the data and provides the data to the decompressor 903. The node selector 902, based on the identification of the control node 800, also selects a representation model (e.g., air conditioning, heating, etc.) for the data and provides this to the decompressor 903.

The decompressor 903 decompresses the data and provides the decompressed data, along with the representation model, to the model processor 904. The model processor performs all of local and global modeling functions for each of the system devices in aggregate, as is discussed above with reference to the local model module 205, global model module 206, global schedule module 207 and local schedule module 208 of FIG. 2, with the exception that the model processor 904 generates one or more local schedules for each device along with selection criteria which is based upon network latency.

The one or more local schedules and selection criteria are provided by the model processor 904 to the schedule buffer 905. In one embodiment, the schedule buffer 905 provides schedules in order of device priority to the compressor 906. The compressor 906 compresses schedules and selection criteria for transmission over the WAN/LAN and the compressed schedules and selection criteria are sent to the node selector 902. The node selector 902 identifies the target node and provides this indication to the transport layer 901 along with the data. The transport layer 901 formats and transmits the data in the form of packets over the WAN/LAN for reception by the demand coordination network and ultimate distribution to the target node.

Figure 10:
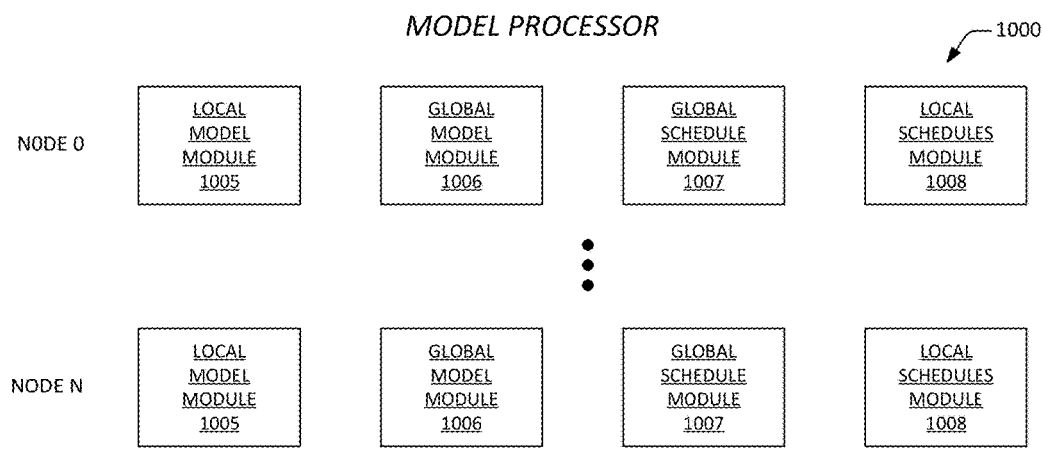
FIG. 10 is a block diagram detailing a model processor for employment within the NOC processor of FIG. 9.

Referring now to FIG. 10, a block diagram is presented illustrating elements of a model processor 1000 according to the present invention, such as may be employed in the NOC processor 900 of FIG. 9. The model processor 1000 includes one or more sets of local model modules 1005, global model modules 1006, global schedule modules 1007, and local schedules modules 1008 for each of N nodes in the system. As noted above with reference to FIG. 9, in operation these modules 1005-1008 perform substantially similar functions as the like-named modules 205-208 of FIG. 2, with the exception that the local schedules modules 1008 generate one or more local schedules for each device along with selection criteria which is based upon network latency.

As noted with reference the FIG. 1, the system 100 may optionally include one or more non-system devices 107, each having associated device control 108 that is coupled to a respective monitor node 109 via a non-system bus (NSB) 114. The monitor node 109 monitors the state of its respective non-system device 107 via its device control 108 to determine whether the non-system device 107 is consuming the managed resource (i.e., turned on) or not (i.e., turned off). Changes to the status of each non-system device 107 are broadcast by its respective monitor node 109 over the DCN 110 to the control nodes 103 and consumption of the resource by these non-system devices 107 is employed as a factor during scheduling of the system devices 101 in order to manage and control peak demand of the resource. The following discussion is directed towards an embodiment of the present invention where there are additionally one or more non-system devices 107 deployed that do not have a corresponding device control 108 and a corresponding monitor node 109. The embodiment that follows is provided to enable either passive or active monitoring of consumption of a given resource by these non-system devices 107 to enable more effective demand coordination of the system 100.

In developing schedules for system devices, in a distributed or in a NOC-controlled demand coordination system 100, the present inventors have observed that it may also be advantageous to know a particular facility's transient energy consumption response to changes in some global variables, such as outside temperature, and to employ knowledge of the facility's transient energy consumption response in development of a demand coordination schedule for the facility. Accordingly, attention is now directed to FIGS. 11-15 where a discussion of how transient energy consumption response may be modeled and employed according to the present invention.

Figure 11:
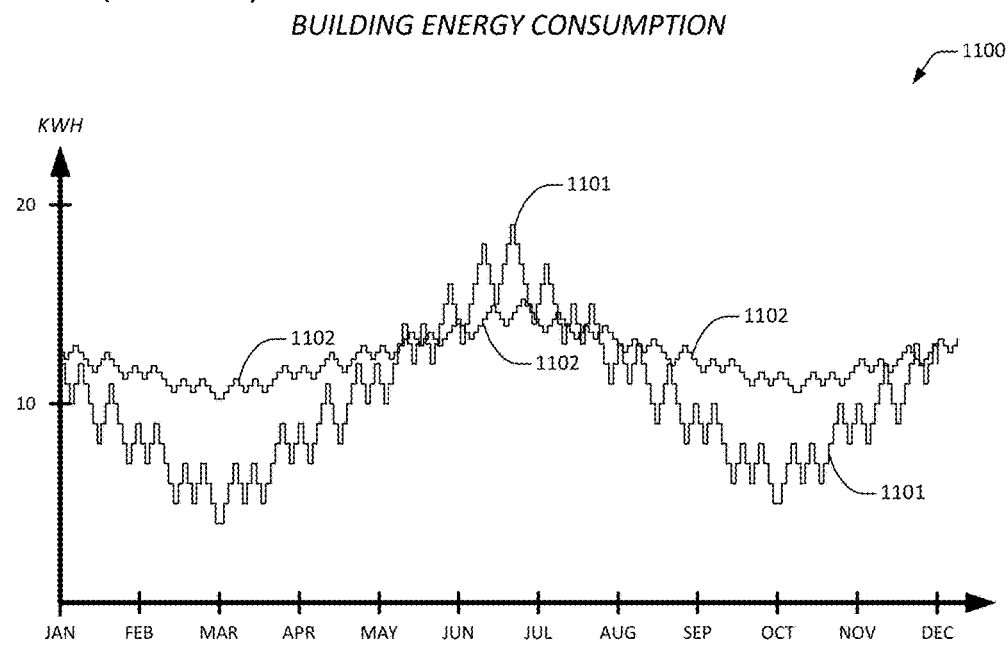
FIG. 11 is a timing diagram illustrating two present day energy consumption profiles for an exemplary building indicating electricity consumed by various components within the building at a level of granularity approximately equal to one week.

Turning to FIG. 11, a timing diagram 1100 is presented illustrating two present day energy consumption profiles 1101-1102 for an exemplary building, indicating electricity consumed by various components within the building at a level of granularity approximately equal to one week. The diagram 1100 depicts approximate weekly energy consumption 1101 over the course of a first year and approximate weekly energy consumption 1102 over the course of a second year. Those skilled in the art will appreciate that the two profiles 1101-1102 are referred to as "baseline energy consumption data" or "baseline data" for the exemplary building. The baseline data does not necessarily have to span a complete year, nor does it have to be at a granularity of one week, though to establish a credible baseline for energy consumption and further modeling and analysis, it is desirable to have a sufficient number of data points so as to fully characterize the span of energy consumption over various weather, occupancy, and other conditions.

Consider profile 1101, where roughly 10 kilowatt hours (kWh) of electricity are consumed by the exemplary building during the weeks in January of the first year, decreasing down to a low of roughly 5 kWh during the weeks surrounding March of the first year, and increasing and peaking to slightly under 20 kWh during the summer months, decreasing to a low usage of roughly 5 kWh in the fall, and increasing up to roughly 10 kWh as it turns cold in the fall. Profile 1101 is typical of many small- to medium-sized buildings (SMBs) in various locations in the world. These SMBs may comprise heating, ventilation, and air-conditioning (HVAC) systems to control climate within the SMBs at a comfort level supporting occupancy. Such is found in factories, schools, churches, airports, office buildings, etc. The HVAC systems may be very simple and thermostat controlled, or they may be part of more complex building management systems (BMSs) that may include occupancy sensors, controlled lighting, and mechanisms to actively manage building energy use by varying activation schedules and/or duty cycles of equipment (e.g., compressors, evaporators, condensers, fans, lights, etc.).

Given that electrical energy is generally purchased from a utility provider (e.g. Tennessee Valley Authority), profile 1101 implies that there are costs associated with heating the exemplary building that increase during colder weather and that decrease following the colder weather as seasonal temperatures increase. Profile 1101 also indicates that there are costs associated with cooling the exemplary building that increase during warmer weather and that decrease following the warmer weather as seasonal temperatures decrease. But heating and cooling costs are not the only components of overall building energy consumption as is shown in profile 1101. Other components may be due to energy use as a function of, but not limited to, occupancy, usage of large equipment, lighting, hours of operation, and equipment maintenance or malfunction issues. It is those other components of energy use that are of interest, in addition to energy use as a function of weather, to the present application. Yet, without installing costly and complex energy monitoring equipment within the exemplary facility, it is difficult at best to separate energy consumption as a function of the weather (i.e., "weather induced energy consumption") from the other components of energy use.

To complicate matters, one skilled in the art will also appreciate that weather is not the same from year to year. Accordingly, profile 1102 is presented as an example of energy consumption by the same exemplary building in a second year, where it is presumed that the configuration and use of the exemplary building may or may not be different in the first and second years. Yet, a building manager, utility grid manager, or energy service company analyst cannot discern the impact of other energy efficiency or demand reduction mechanisms on the building's energy use without first estimating the effects of weather on the building's energy use, subtracting those effects from the overall usage profiles 1101-1102, and normalizing those profiles 1101-1102 to a reference outside temperature (e.g., 65 degrees Fahrenheit (F)) so that the profiles 1101-1102 can be compared in a manner that will yield meaningful results. At this point, all that can be derived from the profiles 1101-1102 of FIG. 1 is that weather in the second year may have been milder that the weather patterns of the first year.

To address the uncertainties associated with determining how much energy an exemplary building should be consuming as a function of weather (namely, outside air temperature), those within the art have fielded standard techniques for estimating the effects of weather on a building's energy consumption, one of which is specified in Measurement of Energy and Demand Savings, ASHRAE Guideline 14-2002, published in 2002 by The American Society of Heating, Refrigerating and Air-Conditioning Engineers, Inc. It is not the intent of the present application to provide an in-depth discussion of the different techniques for estimating weather induced energy consumption effects, for this will be evident to those of skill in the art. What is sufficient to note herein is the essence of these techniques and their limitations when employed to estimate weather induced energy consumption effects using fine-grained energy consumption data.

One skilled in the art will further appreciate that there are many applications for a baseline energy consumption model that is derived from coarse-grained or fine-grained energy use data, such coarse-grained data as is represented by the profiles 1101-1102 of FIG. 11. Once an accurate model of weather induced energy consumption effects has been derived from the profiles 1101-1102, the model may be employed, among other purposes, to allow for meaningful comparisons of energy usage from period to period (e.g., year to year, month to month, etc.), it may be employed to validate data corresponding to demand reduction or energy efficiency programs, or it may be employed to predict future consumption as a function of weather.

Figure 12:
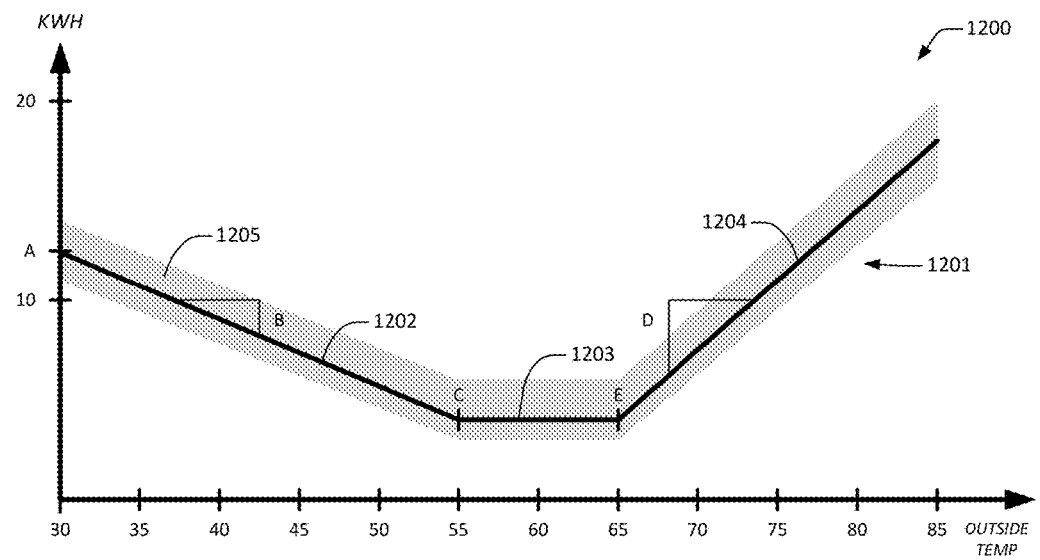
FIG. 12 is a diagram depicting a present day coarse-grained 5-parameter regression baseline model showing energy consumption of the exemplary building as a function of outside temperature, and which is derived from the two energy consumption profiles of FIG. 11.

Now turning to FIG. 12, a diagram 1200 depicting a present day coarse-grained 5-parameter regression baseline model 1201 is presented showing energy consumption of the exemplary building as a function of outside temperature ("weather"). The 5-parameter regression baseline model 1201 is derived from the two energy consumption profiles 1101-1102 of FIG. 11. The model 1201 includes a linear heating component 1202 that is characterized by an intercept A and a heating slope B. The model 1201 also has a baseline consumption component 1203 that is characterized by heating change point C and cooling change point E. The model 1201 further includes a linear cooling component 1204 that is characterized by a cooling slope D. Also shown in the diagram 1200 is a shaded distribution area 1205 that depicts the distribution boundaries of the energy consumption values of either of the profiles 1101-1102, or of the energy consumption values of both of the profiles 1101-1102, depending upon the baseline data that is employed in the 5-parameter regression analysis that results in the model 1201 itself. Generally speaking, as one skilled in the art will appreciate, the accuracy of the model 1201 is increased in correspondence to the amount of baseline energy consumption data that is used to develop the model 1201 via the regression analysis. The temperatures depicted on the axis labeled OUTSIDE TEMP represent average outside temperature for each of the weeks of FIG. 11. For example, weeks in which the average temperature is 55 degrees have their corresponding building energy use values distributed within the shaded area at the 55-degree mark. Weeks in which the average temperature is 75 degrees have their corresponding building energy use values distributed within the shaded area at the 75-degree mark. And so on. The heating component 1202, baseline consumption component 1203, and cooling component 1204, and their corresponding parameters A-E and derived by performing the 5-parameter regression analysis to minimize the residual error term (typically mean squared error between estimate and actual data points). Thus, the model 1201 represents a minimized-residual 5-parameter equation that may be employed to generate an estimate of energy consumption by the exemplary building for a given outside temperature. For instance, the model 1201 indicates that for a week having an average outside temperature of 30 degrees, A kWh will be consumed. In actuality, building energy consumption on 30-degree average temperature weeks varies about parameter A as bounded by the shaded distribution area 1205, but the variance about A of the baseline energy consumption data points used to develop the baseline model 1201 is acceptable and sufficient to be employed for purposes of weather normalization, use estimation, use prediction, and validation of energy demand or energy efficiency program compliance.

Accordingly, the profiles 1101-1102 of FIG. 1 may be normalized to, say, 65 degrees, by subtracting from the weekly energy consumption a model estimate of energy use at the true average weekly temperature, and adding back a model estimate of energy consumption at 65 degrees. These steps are performed for each of the weekly kWh values in both profiles 1101-1102 according to the equation:

$$\hat{E}(i)=E(i)-M[T(i)]+M[T_{REF}], \text{ where:}$$

$\hat{E}(i)$ is an estimated weather normalized energy consumption for week i, E(i) is the actual energy consumption for week i, T(i) is the average weekly temperature for week i, M[T(i)] is the model estimate of energy consumption for the average weekly temperature T(i), $T_{REF}$ is a reference average weekly temperature, and M[$T_{REF}$] is the model estimate of energy consumption for average weekly temperature $T_{REF}$.

Thus, to normalize profiles 101-102 to 65 degrees, 65 is employed in the model 201 as $T_{REF}$, yielding two energy use profiles that are normalized to 65 degrees, which can be compared or employed in other useful analyses. In other words, weather induced effects have been removed from the baseline energy use profiles 101-102 after normalization to 65 degrees.

The present inventors note, however, that the regression model 1201 of FIG. 12 is prevalently employed today, but variations may also be employed to include 4-parameter models where no baseline component 1203 is present, or they may also include occupancy effects, which are not included in the present discussion for clarity sake. Variations may also employ well known heating degree days and cooling degree days in lieu of average temperatures, but those variations are not particularly relevant for purposes of the present application.

It is also noted that the granularity of baseline energy consumption data may be varied as well to develop a regression model. For example, rather than employing weekly energy consumption values to develop a baseline model for normalization purposes, monthly or daily values may be employed as well to provide insight into energy consumption of the exemplary building at a granularity that is required for a given analysis application.

The present inventors have observed, though, that the present day modeling techniques discussed above with reference to FIGS. 11-12 work well and are widely accepted within the art when they are employed using baseline energy consumption data having granularities of one day or greater, however, when energy use data points having granularities less than one day are employed, the resulting models are quite useless and misleading. These problems are more specifically discussed with reference to FIG. 13.

Figure 13:
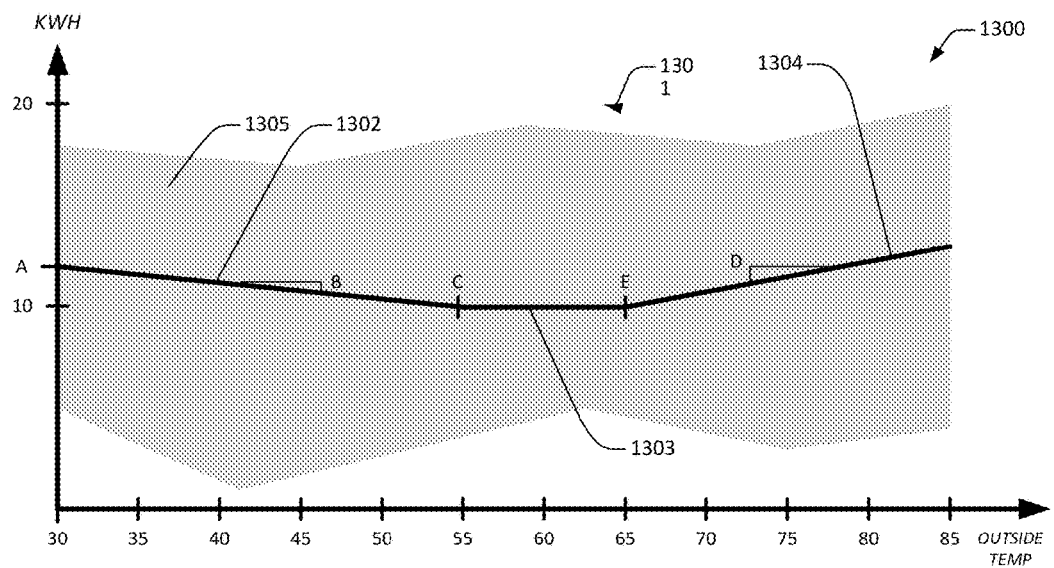
FIG. 13 is a block diagram featuring an exemplary present day 5-parameter regression baseline model for the building of FIG. 11, which is derived from an exemplary energy consumption profile consisting of fine-grained energy consumption data.

Referring to FIG. 13, a block diagram 11300 is presented featuring an exemplary present day 5-parameter regression baseline model 301 for the exemplary building of FIG. 11, which is derived from an exemplary energy consumption profile (not shown) consisting of fine-grained energy consumption data, that is, energy consumption data that is obtained at intervals generally less than one day (e.g., every 12 hours, every 3 hours, every hour). The model 1301 includes a linear heating component 1302 that is characterized by an intercept A and a heating slope B. The model 301 also has a baseline consumption component 1303 that is characterized by a heating change point C and a cooling change point E. The model 1301 further includes a linear cooling component 1304 that is characterized by a cooling slope D. Also shown in the diagram 1300 is a shaded distribution area 1305 that depicts the distribution boundaries of the energy consumption values obtained for the exemplary building and, in contrast to the shaded distribution area 1205 of FIG. 12, the distribution area 1305 of FIG. 3 shows that the baseline energy consumption data used to generate the model 301 varies substantially from the model 1301 itself. And the present inventors have observed that no amount of energy consumption data taken at a fine granularity will improve the accuracy of the model 1301, primarily because the distribution of baseline energy consumption values for any of the outside temperatures appears as noise, which conceals any accurate model parameters that may be characterized therein.

Consequently, even though conventional weather normalization regression techniques have proved accurate and useful when employed to derive baseline models from coarse-grained energy use data (i.e., data with granularity equal to or greater than 24 hours), they utterly fail to yield model parameters that can be used to reliably and accurately estimate building energy consumption as a function of outside air temperature. This is a significant problem, for use of such a model, like model 1301, to normalize fine-grained energy use data for purposes of comparison, estimation, or prediction, will result in gross error.

The present inventors have further observed that present day weather normalization techniques, such as those discussed above with reference to FIGS. 11-13, are limiting in that they do not take in to consideration the energy lag of a building. Not to be confused with thermal lag, which describes a body's thermal mass with respect to time, energy lag according to the present invention describes a building's transient energy consumption characteristics over time as a function of outside temperature. More specifically, a building's energy lag is the time required for the building's energy consumption to go through a transient energy consumption response in order to reach its steady state energy consumption. As one skilled in the art will concur, the energy lag of a building is not just associated with thermal mass, but is also a function of its internal HVAC components and building management system, which operate to optimize energy consumption. In other words, the present inventors have noted that conventional weather normalization techniques are accurate and useful as long as the intervals of energy use data obtained are greater than the energy lag of a given building, because only steady state energy consumption effects are comprehended by present day normalization mechanisms. However, when the energy lag of a building is greater than the interval at which energy data is obtained, accuracy and reliability of a model 301 derived via conventional normalization mechanisms is substantially decreased to the point of uselessness. Although the above noted period of time is referred to as an energy lag, the present inventors note that the value of this period may be positive or negative. For example, a positive energy lag would describe a building having a transient energy consumption period following a change in outside temperature. Alternatively, a negative energy lag would describe a building having a transient energy consumption period preceding a change in outside temperature. Although not common, buildings having negative energy lags may often comprise HVAC components that perform, say, preemptive cooling or heating.

The present invention overcomes the above noted limitations and disadvantages of the prior art, and others, by providing apparatus and methods for characterizing and creating accurate and reliable models of building energy consumption that are derived from fine-grained energy consumption data, namely, data obtained at intervals which are less than the energy lag of the building under consideration. For most SMBs, intervals on the order of one hour would otherwise result in the noisy distribution area 1305 of FIG. 13 because the energy lag of such SMBs is greater than one hour, though the present inventors also note that a noisy distribution 1305 may also result from using baseline data having 24-hour (or greater) granularity for extremely large facilities (e.g., enclosed stadiums), or facilities having very inefficient energy use responses to changes in outside temperature.

The present inventors have further observed that when energy consumption data is shifted in time relative to outside temperature data in a baseline at an amount approximately equal to a building's energy lag, and when regression analyses are performed on this shifted data, noisy distribution areas such as area 1305 of FIG. 3 tend to converge to boundaries approaching acceptable amounts, such as area 205 of FIG. 12. Accordingly, it is an objective of the present invention to determine a building's energy lag and to employ its energy lag when generating weather normalization model parameters, and to furthermore employ the building's energy lag when developing schedules for the demand coordination system 100 of FIG. 1.

Figure 14:
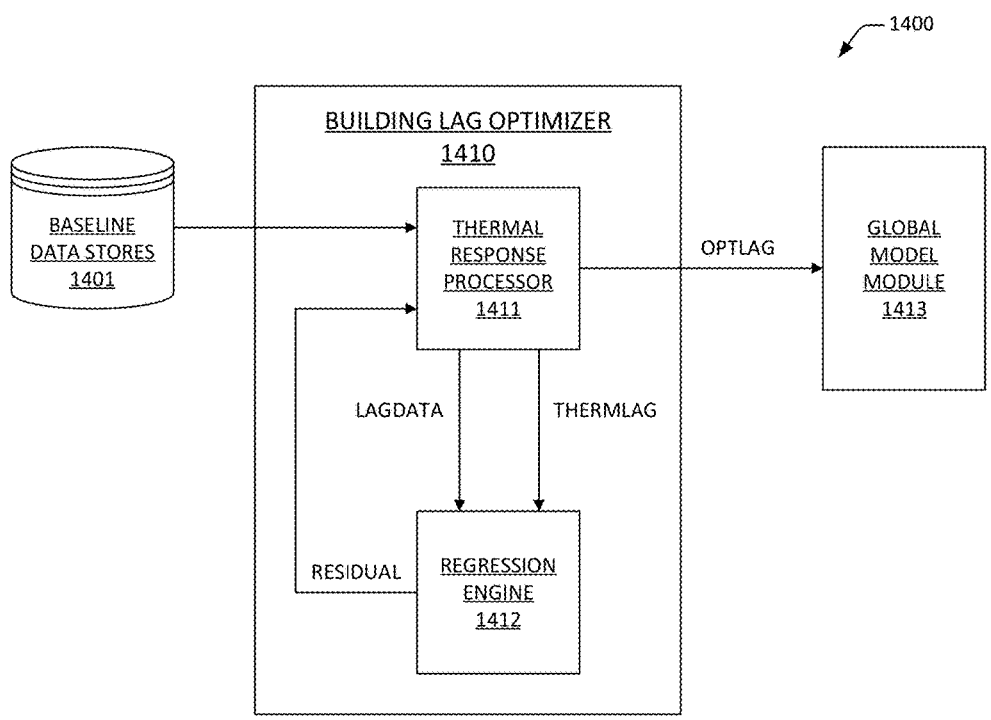
FIG. 14 is a block diagram showing a fine-grained baseline energy data weather normalization apparatus according to the present invention.

Referring now to FIG. 14, a block diagram is presented showing a fine-grained baseline energy data weather normalization apparatus 1400 according to the present invention. The apparatus 1400 may be disposed within the NOC for purposes of developing models and schedules for the system devices 101 within the demand coordination network 100. The apparatus 1400 includes a baseline data stores 1401 that is coupled to a building lag optimizer 1410. The optimizer 1410 includes a thermal response processor 1411 and a regression engine 1412. The processor 1411 is coupled to the regression engine 1412 via a thermal lag bus THERMLAG, a lag data bus LAGDATA, and a residual bus RESIDUAL. The lag optimizer 1410 generates outputs signals indicating values on an optimum lag bus OPTLAG and on an optimum parameters bus OPTPAR.

The baseline data stores 1401 comprises fine-grained baseline energy consumption data corresponding to one or more buildings (or, "facilities"), where there is a sufficient amount of consumption data for each of the one or more buildings to enable an accurate energy consumption baseline regression model to be generated for each of the one or more buildings. In one embodiment, granularity of fine-grained baseline energy consumption data corresponding to some of the one or more buildings is one hour. In another embodiment, granularity of fine-grained baseline energy consumption data corresponding to some of the one or more buildings is 15 minutes. Other embodiments contemplate a combination of intervals that would be construed as "fine-grained" according to the present disclosure, such as 24-hour interval data for buildings having energy lags greater than 24 hours. Further embodiments comprehend fine-grained energy consumption data that differs in interval size from building to building within the stores 1401. In one embodiment, the stores 1401 may be collocated with the building lag optimizer 1410 such as, but not limited to, within the NOC 122. The baseline energy consumption data for each of the one or more buildings comprises a time of day value or other type or value from which granularity of the baseline energy consumption data may be determined. Likewise, all embodiments comprise an outside temperature value corresponding to each data point of energy consumption for each of the one or more buildings.

In operation, the regression engine 1412 functions to generate energy consumption baseline regression models characterized by model parameters for one or more fine-grained baseline energy consumption profiles, as are discussed above. Embodiments of the regression engine 1412 comprehend a 5-parameter multivariable regression model that minimizes its residual term, or a 4-parameter multivariable regression model that minimizes its residual term, or other multivariable regression techniques that are known in the art for use in developing baseline energy consumption models. In one embodiment, the regression engine 1412 may comprise a combination of the above noted regression models.

Baseline energy consumption data for a selected one of the one or more buildings may be downloaded to the thermal response processor 1411 or the consumption data may be streamed over a network of interconnections known in the art. In addition, the thermal response processor 1411 may be configured to accept downloaded or streamed data for a plurality of the one or more buildings simultaneously and may be employed to control the regression engine 1412 for purposes of determining an optimal energy lag for one or each of the plurality of the one or more buildings whose baseline energy consumption data are obtained via the stores 1401. For purposes of clarity, operation of the thermal response processor 1411 will be discussed with reference to generation of an optimum energy lag and associated optimum regression model parameters corresponding to a single one of the one or more buildings.

Responsive to baseline energy consumption data that is received from the baseline data stores 1401, the thermal response processor 1411 provides the data to the regression engine 1412 over LAGDATA along with a first value on THERMLAG that indicates an amount of time lag to shift energy consumption data relative to time stamp and outside temperature values in the baseline data. The first value on THERMLAG may be a time of day, or may merely be an integer value indicating how many increments to shift energy consumption data so that it lags the time and temperature values in the baseline data by that number of increments.

Upon reception of the baseline data on LAGDATA and a first lag value on THERMLAG, the regression engine 1412 performs a regression function as noted above to generate first model parameters and a first residual for a first corresponding model to be employed for analysis purposes. The first model parameters are output to bus OPTMPAR and the first residual is provided to the response processor 1411 on bus RESIDUAL.

In a second iteration, the processor 1411 generates an second value on THERMLAG that results in a corresponding shift in the energy consumption data relative to the time stamp and outside temperature values of the baseline data. The second value, in one embodiment, is an increment of the first value. Responsively, the regression engine 1412 generates second model parameters and a second residual for a second corresponding model to be employed for analysis purposes. The second model parameters are output to bus OPTMPAR and the second residual is provided to the response processor 1411 on bus RESIDUAL.

The iterations of energy lag continue, with generation of respective model parameters, lag values, and residuals until a lag threshold has been reached indicating that the baseline energy consumption data has been shifted a number of increments greater than an estimated energy lag of the building being modeled. In an embodiment that is using energy baseline data in 1-hour increments, 24 iterations may be performed, thus generating 24 thermal lag values and 24 sets of regression model parameters (e.g., parameters A-E in FIGS. 12-13).

Upon completion of the iterations, the thermal response processor 1411 compares all of the residuals generated by each of the above iterations, and determines which one of the residuals is less than all of the other residuals. The lag value that corresponds to the minimum value residual resulting from all of the above iterations corresponds to the energy lag of the building under consideration, and that lag value is output on bus OPTLAG along with model parameters that were generated using that lag value.

The present inventors note that other embodiments of the building lag optimizer 410 contemplate variations of the thermal response processor 1411 that perform shifting of the baseline consumption data itself relative to time stamp and temperature data, and that receives model parameters from the regression engine 1411, and which generates both values on OPTLAG and OPTMPAR. Via such embodiments a conventional regression engine 1412 may be employed as opposed to one that performed the additional functions of time shifting the energy consumption data.

The building lag optimizer 1410 according to the present invention is configured to perform the functions and operations as discussed above. The optimizer 1410 may comprise logic, circuits, devices, or application programs (i.e., software) disposed within a non-transitory medium such as a hard disk or non-volatile memory, or a combination of logic, circuits, devices, or application programs, or equivalent elements that are employed to execute the functions and operations according to the present invention as noted. The elements employed to accomplish these operations and functions within the building lag optimizer 1410 may be shared with other circuits, logic, etc., that are employed to perform other functions and/or operations commensurate with intended application.

Figure 15:
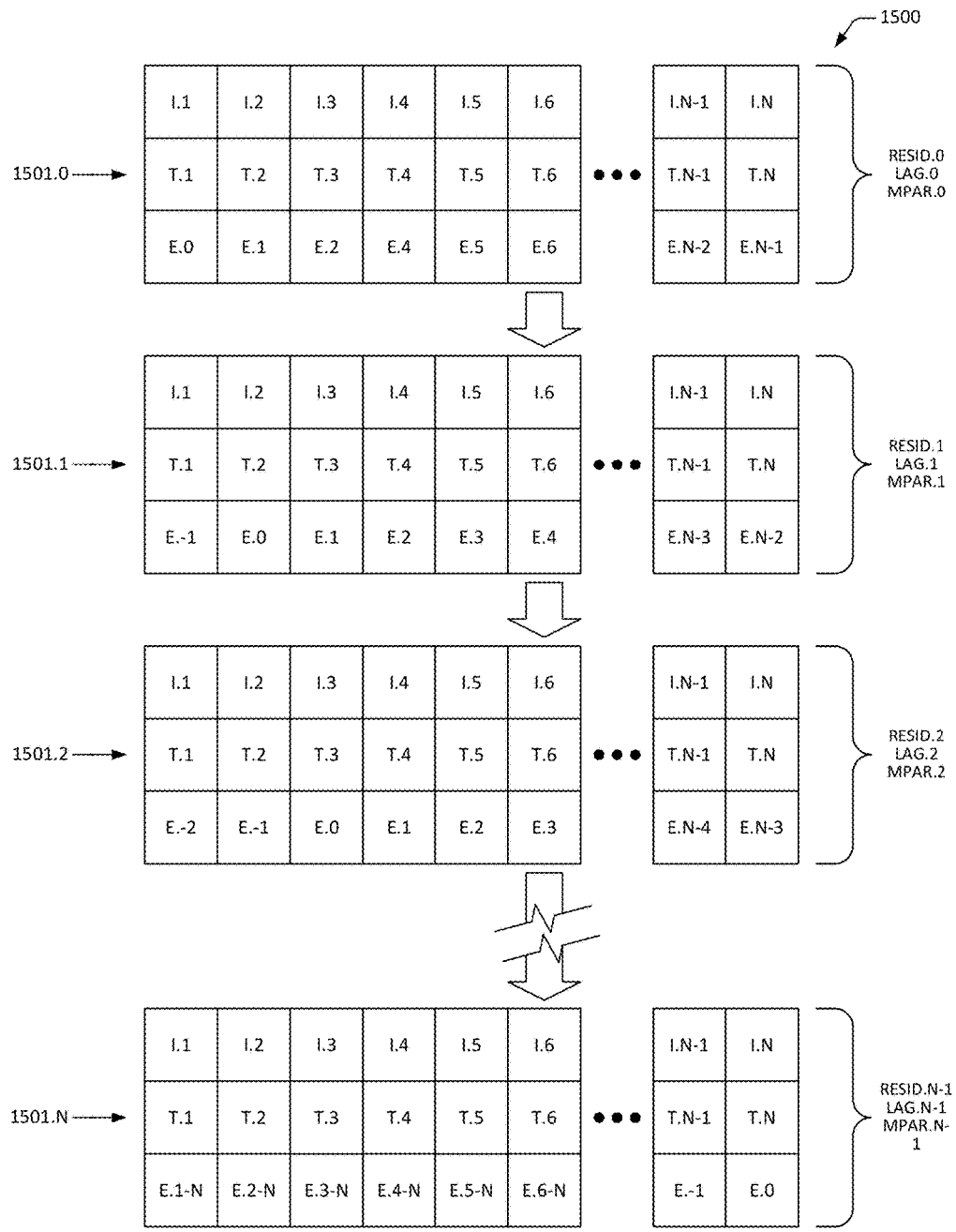
FIG. 15 is a diagram illustrating a fine-grained baseline energy data weather normalization method according to the present invention.

Now turning to FIG. 15, a diagram 1500 is presented illustrating a fine-grained baseline energy data weather normalization method according to the present invention, such as may be employed in the building lag optimizer 1410 of FIG. 14. The diagram 1500 depicts a plurality of time shifted versions 1501.1-1501.N−1 of a portion of an exemplary energy consumption baseline profile, where it is noted that the exemplary energy consumption baseline profile comprises a number of data points equal to or greater than 2N−1, and wherein successively increasing values of index correspond to later points in time. That is, for baseline data having intervals of 1 hour, an index of 3 (e.g. I.3, T.3, E.3) comprises energy consumption data that is one hour later than baseline data having an index of 2 (e.g., I.2, T.2, E.2). Each of the time shifted versions 1501.1-1501.N−1 comprises N time stamps I.1-I.N−1, N outside temperature values T.1-T.N−1, and N energy consumption values E.X-E.X+N−1. A first time shifted version 1501.1 comprises a 0-index time shift in the portion of the originally obtained baseline energy consumption data. A second time shifted version 1501.2 comprises a 1-index time shift. A third time shifted version 1501.3 comprises a 2-index time shift. And so on until an Nth time shifted version 1501.N comprises an N−1-index time shift.

According to the present invention, a lag LAG.0-LAG.N−1 equal to the time shift is recorded, and multiple regression model parameters MPAR.0-MPAR.N−1 and residuals RESID.0-RESID.N−1 are generated by the regression engine 1412. The thermal response processor 1411 then compares all N residuals and selects the one having the least value as the optimum residual. Accordingly, the lag value and model parameters corresponding to the optimum residual are designated as the optimum energy lag and optimum regression model parameters for the building under consideration. Henceforth, when analyses are performed for the building under consideration, the optimum regression model parameters and optimal energy lag are employed to perform weather normalization comparisons, efficiency analyses, consumption predictions, validations, etc.

The techniques discussed above with reference to FIGS. 14-15 disclose specific embodiments for performing the functions required on one or more sets of baseline energy consumption data in order to determine a given building's energy lag along with optimum multiple regression model parameters that may be employed to perform weather normalization and other useful applications. However, the present inventors note that the steps described above are exemplary of other mechanisms that may be employed to shift baseline data relative to outside temperature in order to identify a building's energy lag (i.e., the time associated with a least-valued residual within a plurality of residuals corresponding to a plurality of mutually exclusive shifts in time of the baseline data), and to derive therefrom optimal regression model parameters. What one skilled in the art will appreciate from the above disclosure is that essential features of the present invention are performing a plurality of multiple variable regressions yielding a corresponding plurality of residuals, where each of the plurality of multiple variable regressions is associated with a time shift of energy consumption baseline data that is mutually exclusive of remaining time shifts associated with remaining multiple variable regressions within the plurality of multiple variable regressions.

Throughout this disclosure, exemplary techniques and mechanisms have been employed in order to clearly teach features of the present invention. For instance, the thermal response processor discussed with reference to FIGS. 14-15 is described in terms of a line search to find the optimal building energy lag, however the present inventors note that the present invention comprehends many other techniques for finding optimal energy lag parameters that may be more efficiently employed in accordance with system configuration. These techniques may include, but are not limited to, bisection methods, Newton's method, and thermal annealing methods.

The present inventors also note that multiple variable regression analysis techniques are presented above with reference to the present invention in order to teach relevant aspects using prevalently known mechanisms in the art. However, it is noted that the present invention may also be embodied within configurations that utilize techniques other than multiple variable regression analysis in order to derive modeling parameters that accurately characterize a building's energy consumption and energy lag. Such techniques may include, but are not limited to, As one skilled in the art will appreciate, more than one statistical technique may be used to produce an approximation of a building's dependent energy relation with weather and lag. Any such technique is formalized as a function of independent parameters that describe baseline energy consumption data for the building relative to outside temperature and unknown mutually exclusive shifts in time of the baseline data's parameters. The difference between observed values of energy consumption and estimated values of energy consumption associated with such a function is a quantity that one skilled in the art seeks to minimize in order to improve model accuracy. Although the residuals are employed herein as a measure of goodness-of-fit, the present inventors note that other variables are contemplated by the present invention which include, but are not limited to, linear models of more or less parameters, non-linear models of a parabolic or higher polynomial order as well as machine learning modeling techniques (e.g., neural-networks, decision trees, etc.).

What is claimed is:

1. An apparatus for controlling peak demand of a resource within a facility, the apparatus comprising:
   a plurality of devices, disposed within the facility, each consuming a portion of the resource when turned on, and said each capable of performing a corresponding function within an acceptable operational margin by cycling on and off;
   a network operations center (NOC), disposed external to the facility, configured to determine an energy lag for the facility based upon fine-grained energy consumption baseline data, and configured to employ said energy lag to generate a plurality of run time schedules, wherein said plurality of run time schedules coordinates run times for said each of said plurality of devices to control the peak demand of the resource, and wherein one or more of said run times start prior to when otherwise required to maintain corresponding local environments while operating within corresponding acceptable operating margins; and
   a plurality of control nodes, disposed within the facility, each coupled to a corresponding one of said plurality of devices, wherein said plurality of control nodes is coupled together via a demand coordination network that is operatively coupled to said NOC, and wherein said plurality of control nodes transmits sensor data and device status to said NOC via said demand coordination network for generation of said plurality of run time schedules, and wherein said plurality of control nodes executes selected ones of said run time schedules to cycle said plurality of devices on and off.

2. The apparatus as recited in claim 1, wherein coordination of said run times for said plurality of devices comprises advancing a first one or more of a plurality of start times, deferring a second one or more of said plurality of start times, and increasing one or more of a plurality of duty cycles.

3. The apparatus as recited in claim 1, wherein said NOC develops sets of descriptors, each set characterizing an associated one of said corresponding local environments.

4. The apparatus as recited in claim 3, wherein said NOC employs said sensor data and said device status to adjust associated sets of descriptors.

5. The apparatus as recited in claim 1, wherein said NOC develops and maintains a global run time schedule that specifies start time, duration, and duty cycle for said each of said plurality of devices.

6. The apparatus as recited in claim 4, further comprising:
   a monitor node, coupled to a non-system device and to said demand coordination network, configured to broadcast when said non-system device is consuming the resource, wherein said NOC accounts for consumption of the resource by said non-system device when generating said global run time schedule.

7. The apparatus as recited in claim 1, wherein said NOC generates two or more of said plurality of run time schedules for said each of said plurality of devices, and wherein said each of said plurality of control nodes selects one of said two or more of said plurality of run time schedules for execution based upon latency of last communication with said NOC.

8. The apparatus as recited in claim 1, wherein said demand coordination network comprises an IEEE 802.15.4 wireless network.

9. A peak demand control system, for managing peak energy demand within a facility, the peak demand control system comprising:
   a network operations center (NOC), disposed external to the facility, configured to determine an energy lag for the facility based upon fine-grained energy consumption baseline data, and configured to employ said energy lag to generate a plurality of run time schedules, wherein said plurality of run time schedules coordinates run times for each of a plurality of devices to manage the peak energy demand, and wherein one or more of said run times start prior to when otherwise required to maintain corresponding local environments while operating within corresponding acceptable operating margins;
   a plurality of control nodes, disposed within the facility, each coupled to a corresponding one of said plurality of devices, wherein said plurality of control nodes are coupled together via a demand coordination network and operatively coupled to said NOC, and wherein said plurality of control nodes transmits sensor data and device status to said NOC via said demand coordination network for generation of said plurality of run time schedules, and wherein said plurality of control nodes executes selected ones of said run time schedules to cycle said plurality of devices on and off; and
   one or more sensor nodes, coupled to said demand coordination network, configured to provide one or more global sensor data sets to said NOC, wherein said NOC employs said one or more global sensor data sets in determining said run times.

10. The peak demand control system as recited in claim 9, wherein coordination of said run times for said plurality of devices comprises advancing a first one or more of a plurality of start times, deferring a second one or more of said plurality of start times, and increasing one or more of a plurality of duty cycles.

11. The peak demand control system as recited in claim 9, wherein said NOC develops sets of descriptors, each set characterizing an associated one of said corresponding local environments.

12. The peak demand control system as recited in claim 11, wherein said NOC employs said sensor data and said device status to adjust associated sets of descriptors.

13. The peak demand control system as recited in claim 9, wherein said NOC develops and maintains a global run time schedule that specifies start time, duration, and duty cycle for said each of said plurality of devices.

14. The peak demand control system as recited in claim 4, further comprising:
   a monitor node, coupled to a non-system device and to said demand coordination network, configured to broadcast when said non-system device is consuming energy, wherein said NOC accounts for consumption of said energy by said non-system device when generating said global run time schedule.

15. The peak demand control system as recited in claim 1, wherein said NOC generates two or more of said plurality of run time schedules for said each of said plurality of devices, and wherein said each of said plurality of control nodes selects one of said two or more of said plurality of run time schedules for execution based upon latency of last communication with said NOC.

16. The peak demand control system as recited in claim 1, wherein said demand coordination network comprises an IEEE 802.15.4 wireless network.

17. A method for controlling peak demand of a resource within a facility, the method comprising:
- via a network operations center (NOC) external to the facility, determining an energy lag for the facility based upon fine-grained energy consumption baseline data, and employing the energy lag to generate a plurality of run time schedules, wherein the plurality of run time schedules coordinates run times for each of a plurality of devices to control the peak demand of the resource, and wherein one or more of the run times start prior to when otherwise required to maintain corresponding local environments while operating within corresponding acceptable operating margins;
- controlling each of the plurality of devices via corresponding control nodes, wherein the each of the plurality of devices consumes a portion of the resource when turned on, and wherein the each of the plurality of devices is capable of performing a corresponding function within an acceptable operational margin by cycling on and off, and wherein the corresponding control nodes execute selected ones of the plurality of run time schedules to cycle the plurality of devices on and off; and
- first coupling the corresponding control nodes together via a demand coordination network that is operatively coupled to the NOC, and employing the demand coordination network to transmit sensor data and device status to the NOC for generation of the plurality of run time schedules.

18. The method as recited in claim 17, wherein coordination of the run times for the plurality of devices comprises advancing a first one or more of a plurality of start times, deferring a second one or more of the plurality of start times, and increasing one or more of a plurality of duty cycles.

19. The method as recited in claim 17, wherein the NOC develops sets of descriptors, each set characterizing an associated one of the corresponding local environments.

20. The method as recited in claim 19, wherein the NOC employs the sensor data and the device status to adjust associated sets of descriptors.

21. The method as recited in claim 17, wherein the NOC develops and maintains a global run time schedule that specifies start time, duration, and duty cycle for the each of the plurality of devices.

22. The apparatus as recited in claim 21, further comprising:
- second coupling a non-system device and to the demand coordination network, and broadcasting when the non-system device is consuming the resource, wherein the NOC accounts for consumption of the resource by the non-system device when generating the global run time schedule.

* * * * *